US010212377B2

(12) United States Patent
Mabuchi

(10) Patent No.: US 10,212,377 B2
(45) Date of Patent: *Feb. 19, 2019

(54) SOLID-STATE IMAGE SENSING APPARATUS

(71) Applicant: Sony Corporation, Tokyo (JP)

(72) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 14/731,998

(22) Filed: Jun. 5, 2015

(65) Prior Publication Data
US 2015/0271404 A1   Sep. 24, 2015

Related U.S. Application Data

(63) Continuation of application No. 14/705,783, filed on May 6, 2015, now Pat. No. 9,648,264, which is a (Continued)

(30) Foreign Application Priority Data

Sep. 4, 2003 (JP) ................................ 2003-312498

(51) Int. Cl.
*H04N 5/376* (2011.01)
*H04N 3/14* (2006.01)
(Continued)

(52) U.S. Cl.
CPC .......... *H04N 5/3765* (2013.01); *H04N 3/155* (2013.01); *H04N 5/23241* (2013.01);
(Continued)

(58) Field of Classification Search
CPC .. H04N 5/23241; H04N 5/3765; H04N 3/155; H04N 5/374; H04N 5/3745; H04N 5/378
(Continued)

(56) References Cited

U.S. PATENT DOCUMENTS 5,377,228 A  12/1994 Ohara et al.
5,757,297 A   5/1998 Ferraiolo et al.
(Continued)

FOREIGN PATENT DOCUMENTS

JP   09-153821   6/1997
JP   2000-333081  11/2000
(Continued)

OTHER PUBLICATIONS

"CCS Technical Documentation NHL-2A Series Transceivers: Camera Module". Nokia Corporation. Jul. 2002.*
(Continued)

*Primary Examiner* — Lin Ye
*Assistant Examiner* — Chriss S Yoder, III
(74) *Attorney, Agent, or Firm* — Michael Best & Friedrich LLP

(57) ABSTRACT

In a solid-state image sensing apparatus of an addressing method, a clock-conversion part generates a high-speed clock signal having a frequency two times or more the frequency of a low-speed clock signal. A signal processing part receives 10-bit pixel data through a horizontal signal line, performs predetermined signal processing, and passes parallel-format data to a switching part. The switching part selects each one bit of the parallel-format 10-bit data in a predetermined sequence to output from an output terminal using the high-speed clock signal from the clock-conversion part as a switching command, thus converts the parallel-format data into serial-format data, and passes it to an output buffer. The output buffer externally outputs differential output of normal video data and inverted video data individually from output terminals. Accordingly, the problems in power consumption, noises, and unnecessary radiation are solved, and higher-speed output is achieved.

26 Claims, 20 Drawing Sheets

Related U.S. Application Data continuation of application No. 13/538,917, filed on Jun. 29, 2012, which is a continuation of application No. 10/934,886, filed on Sep. 3, 2004, now Pat. No. 9,060,126.

(51) Int. Cl.
| | | |
|---|---|---|
| *H04N 5/232* | (2006.01) | |
| *H04N 5/3745* | (2011.01) | |
| *H04N 5/378* | (2011.01) | |
| *H04N 5/374* | (2011.01) | |

(52) U.S. Cl.
CPC ............ *H04N 5/374* (2013.01); *H04N 5/378* (2013.01); *H04N 5/3745* (2013.01)

(58) Field of Classification Search
USPC ......... 348/220.1, 222.1, 312, 525, 536, 537, 348/572, 575; 250/208.1, 208.2, 214 DC; 341/101, 141
See application file for complete search history.

(56) References Cited

U.S. PATENT DOCUMENTS

| | | | |
|---|---|---|---|
| 5,790,072 A | 8/1998 | Gerveshi et al. | |
| 5,798,720 A * | 8/1998 | Yano | H03K 5/1534 |
| | | | 341/100 |
| 5,877,715 A | 3/1999 | Gowda et al. | |
| 5,880,691 A | 3/1999 | Fossum et al. | |
| 5,920,274 A | 7/1999 | Gowda et al. | |
| 5,929,905 A * | 7/1999 | Kanda | H04N 5/335 |
| | | | 348/222.1 |
| 5,982,309 A | 11/1999 | Xi et al. | |
| 6,031,473 A | 2/2000 | Kubinec | |
| 6,188,339 B1 | 2/2001 | Hasegawa | |
| 6,292,218 B1 | 9/2001 | Parulski et al. | |
| 6,335,696 B1 | 1/2002 | Aoyagi et al. | |
| 6,407,682 B1 | 6/2002 | Jones | |
| 6,411,230 B1 | 6/2002 | Tauchen et al. | |
| 6,452,632 B1 | 9/2002 | Umeda et al. | |
| 6,492,973 B1 | 12/2002 | Kuroki et al. | |
| 6,515,271 B1 * | 2/2003 | Shimizu | H04N 5/335 |
| | | | 250/208.1 |
| 6,657,574 B1 | 12/2003 | Rhode | |
| 6,686,957 B1 | 2/2004 | Johnson et al. | |
| 6,741,193 B2 | 5/2004 | Nagata | |
| 6,831,690 B1 | 12/2004 | John et al. | |
| 6,881,942 B2 | 4/2005 | Huang et al. | |
| 6,992,792 B2 | 1/2006 | Blumer | |
| 6,999,115 B1 | 2/2006 | Katoh | |
| 7,310,452 B2 | 12/2007 | Nam | |
| 7,339,151 B2 | 3/2008 | Mabuchi | |
| 7,649,548 B1 * | 1/2010 | Knuutila | H04N 5/232 |
| | | | 348/207.11 |
| 2002/0071037 A1 * | 6/2002 | Haavisto | H04N 5/23203 |
| | | | 348/207.99 |
| 2002/0101528 A1 * | 8/2002 | Lee | H04N 3/155 |
| | | | 348/304 |
| 2002/0135690 A1 | 9/2002 | Tashiro et al. | |
| 2003/0142219 A1 * | 7/2003 | McGarvey | H04N 5/3765 |
| | | | 348/222.1 |
| 2003/0150976 A1 | 8/2003 | Mabuchi | |
| 2004/0257453 A1 | 12/2004 | Lee et al. | |
| 2005/0100088 A1 * | 5/2005 | Kaikumaa | H04N 1/2166 |
| | | | 375/240.01 |
| 2005/0146625 A1 | 7/2005 | Kubo et al. | |

FOREIGN PATENT DOCUMENTS

| | | |
|---|---|---|
| JP | 2000-341592 | 12/2000 |
| JP | 2001-223947 | 8/2001 |
| JP | 2003-008435 | 1/2003 |
| JP | 2003-102034 | 4/2003 |
| JP | 2003-178583 | 6/2003 |
| JP | 2003-234957 | 8/2003 |
| JP | 2004-266745 | 9/2004 |

OTHER PUBLICATIONS

Ackland, B.; Dickinson, A., "Camera on a chip," in Solid-State Circuits Conference, 1996. Digest of Technical Papers. 42nd ISSCC., 1996 IEEE International , vol., No., pp. 22-25, 10-10 Feb. 1996.*
"SMIA 1.0 Part 2:CCP2 Specification". 2004, pp. 1-74.*

* cited by examiner

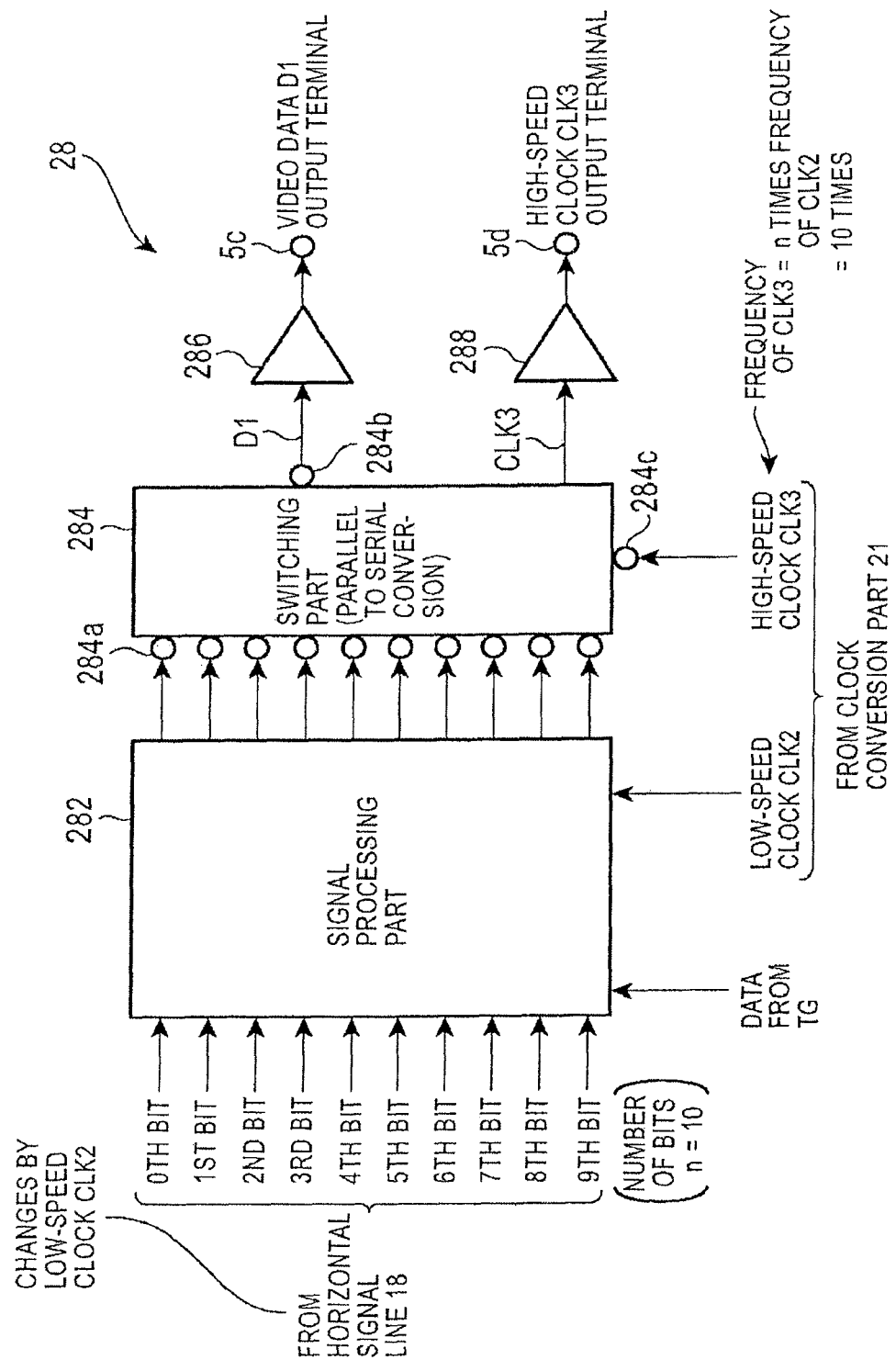

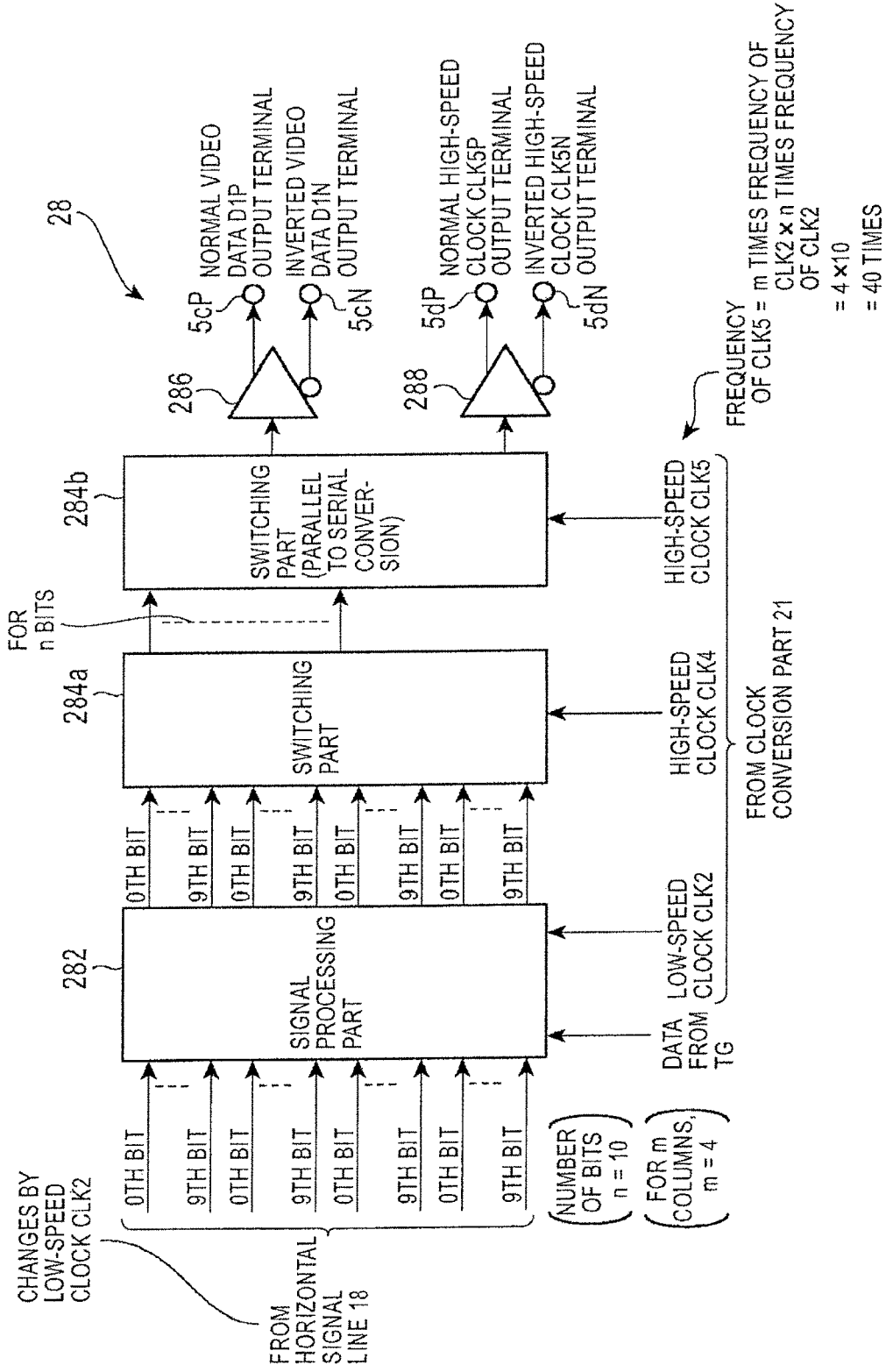

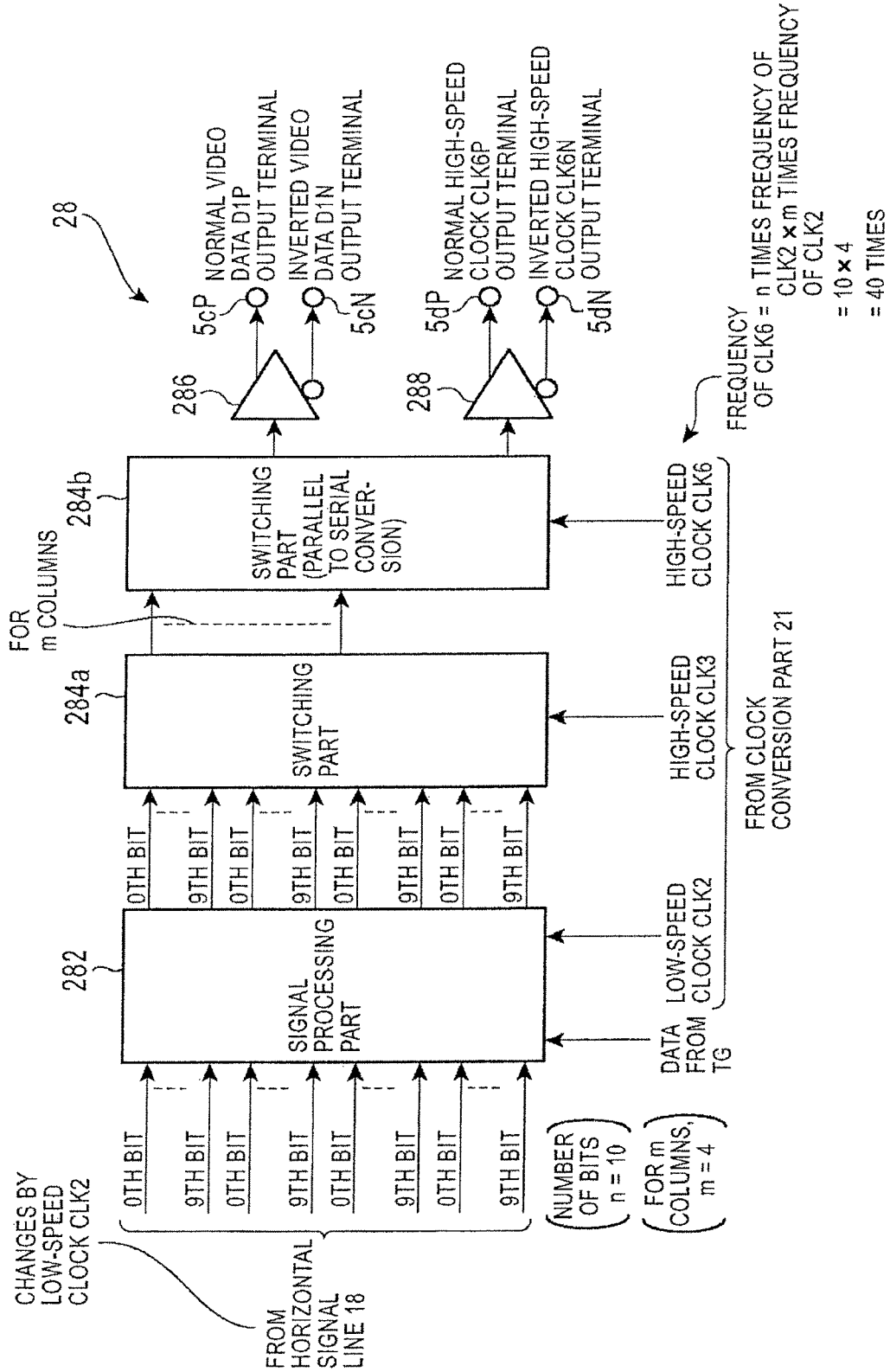

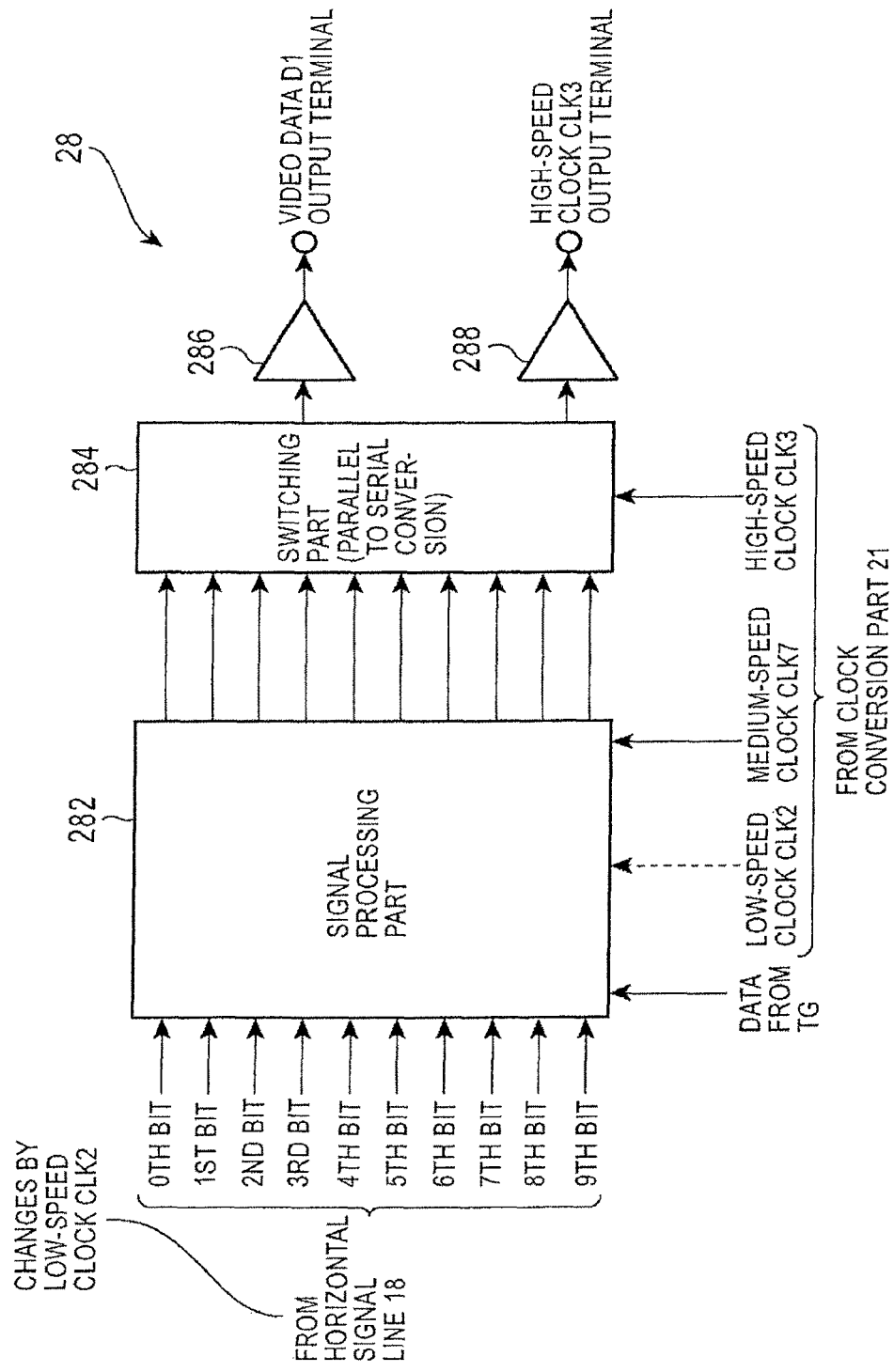

SOLID-STATE IMAGE SENSING APPARATUS

CROSS REFERENCES TO RELATED APPLICATIONS

This is a Continuation Application of the patent application Ser. No.: 14/705,783, filed May 6, 2015, which is a Continuation Application of the patent application Ser. No.: 13/538,917, filed Jun. 29, 2012, which is a Continuation Application of patent application Ser. No.: 10/934,886, filed Sep. 3, 2004, now U.S. Patent No.: 9,060,126, issued Jun. 16, 2015, which claims priority from Japanese Patent Application No.: 2003-312498, filed Sep. 4, 2003, the entire contents of which being incorporated herein by reference.

BACKGROUND OF THE INVENTION

1. Field of the Invention

The present invention relates to a solid-state image sensing apparatus in which a plurality of unit pixels are arranged, and a signal from each unit pixel can be arbitrarily selected and read out by address control.

2. Description of the Related Art

In an amplified solid-state image sensing device (also called APS; active pixel sensor/gain cell), which is a kind of X-Y addressing-type solid-state image sensing device, pixels are composed using active devices having a MOS structure, etc. (MOS transistors) in order to have an amplification function in pixels themselves. Specifically, signal electric charge stored in a photodiode, which is a photoelectric transfer device, is amplified by the active device, and is read out as image information.

In an X-Y addressing-type solid-state image sensing device, for example, a large number of pixel transistors are arranged in a two-dimensional matrix to constitute a pixel area. Storage of signal electric charge corresponding to incident light is started for each line (row) or for each pixel. The signal of electric current or voltage based on the stored signal electric charge is read out in sequence from each pixel by addressing (for example, refer to Japanese Unexamined Patent Application Publication Nos. 11-239299, 2001-069408, 2001-298748 and 2003-031785). For example, in a VGA format of 300 thousand pixels, 30 pieces of images are output per one second, which appears smooth animation to human eyes at an output rate of 12 MHz.

Meanwhile, in recent years, it is expected that images are output at 30 pieces/second using, for example, an image sensing device having ultra-many pixels. In specific examples, images are output at 30 pieces/second from a solid-state image sensing apparatus having 3 million pixels or 30 million pixels. Also, when high time resolution is required, such as in the case of a car collision experiment or monitoring an impact moment of a ball hit by a baseball batter, it is necessary to output 100 to 10 thousand pieces of images per one second.

Here, as a method of satisfying the above-described requirements at a low data rate, a method of increasing output terminals, providing hundreds of output terminals, and outputting signals in parallel is considered.

However, in that case, the number of output terminals becomes large, and thus various problems arise. For example, the area of the solid-state image sensing apparatus becomes large (increases cost), the ICs in the next stage becomes large by the increase of input terminals, the implementation becomes difficult, miniaturization of the camera becomes difficult, the synchronization of so many output terminals is difficult, and the outputting at a high clock rate is difficult due to the difficulty of synchronization.

As a method of improving these problems, an increase in read-out speed is considered. In this case, for example, in order to output images at 30 pieces/second from a solid-state image sensing apparatus having 3 million pixels or 30 million pixels, the operation becomes 120 MHz or 1.2 GHz, individually. Also, when a high time resolution is required, for example, in the case of outputting 1,000 to 10,000 pieces of images, increasing the read-out speed is effective.

However, if the read-out speed is simply increased, problems, such as an increase in power consumption, noises, unnecessary radiation, might occur.

SUMMARY OF THE INVENTION

The present invention has been made in view of the circumstances described above. It is an object of the present invention to provide a solid-state image sensing device which solves at least one of the problems, that is to say, an increase in power consumption, noises, and unnecessary radiation, and which can achieve higher-speed output.

In order to achieve the object described above, according to an aspect of the present invention, there is provided a solid-state image sensing device. The image sensing device includes: a pixel area which has an electric-charge generation part for generating signal electric charge, and outputs an analog pixel signal corresponding to the signal electric charge generated by the electric-charge generation part; an AD-conversion part which converts the pixel signal output from the pixel area into pixel data, which is digital data; a high-speed clock generation part which generates a high-speed clock signal, which is a pulse signal having a higher frequency than a basic clock signal that is a basic pulse signal corresponding to a driving pulse signal for driving the pixel area; and a data-output part which externally outputs a predetermined output data based on the pixel data that is converted into digital data by the AD-conversion part in accordance with the high-speed clock signal generated by the high-speed clock generation part.

According to another aspect of the present invention, there is provided a solid-state image sensing device. The image sensing device includes: a pixel area which includes an electric-charge generation part for generating electric charge in accordance with incident light; and an AD-conversion part which converts an analog signal sent from the pixel area into a digital signal, wherein the pixel area is driven in accordance with a first clock signal, and the digital signal from the AD-conversion part is output in accordance with a second clock signal having a higher frequency than that of the first clock signal.

According to another aspect of the present invention, there is provided a camera. The camera includes: a pixel area which has an electric-charge generation part for generating electric charge in accordance with incident light; an AD-conversion part which converts an analog signal sent from the pixel area into a digital signal; and an optical system for leading incident light into the pixel area, wherein the pixel area is driven in accordance with a first clock signal, and the digital signal from the AD-conversion part is output in accordance with a second clock signal having a higher frequency than that of the first clock signal.

BRIEF DESCRIPTION OF THE DRAWINGS

FIG. 7 is a circuit block diagram illustrating a variation of the output circuit of the second example;

FIG. 12 is a circuit block diagram illustrating a combination example structure of the example structures of the second and the third output circuits;

FIG. 13 is a circuit block diagram illustrating another combination example structure of the example structures of the second and the third output circuits;

FIGS. 14A and 14B are circuit block diagrams illustrating a fourth example structure of the output circuit;

DESCRIPTION OF THE PREFERRED EMBODIMENTS

In the following, a detailed description will be given of embodiments of the present invention with reference to the drawings. In this regard, a description will be given, in the below, of the case where the present invention is applied to a CMOS image sensing device, which is an example of a solid-state image sensing apparatus of an X-Y addressing type. Also, a description will be given assuming that a CMOS image sensing device consists of all NMOS pixels.

Structure of Solid-State Image Sensing Apparatus

Figure 1:
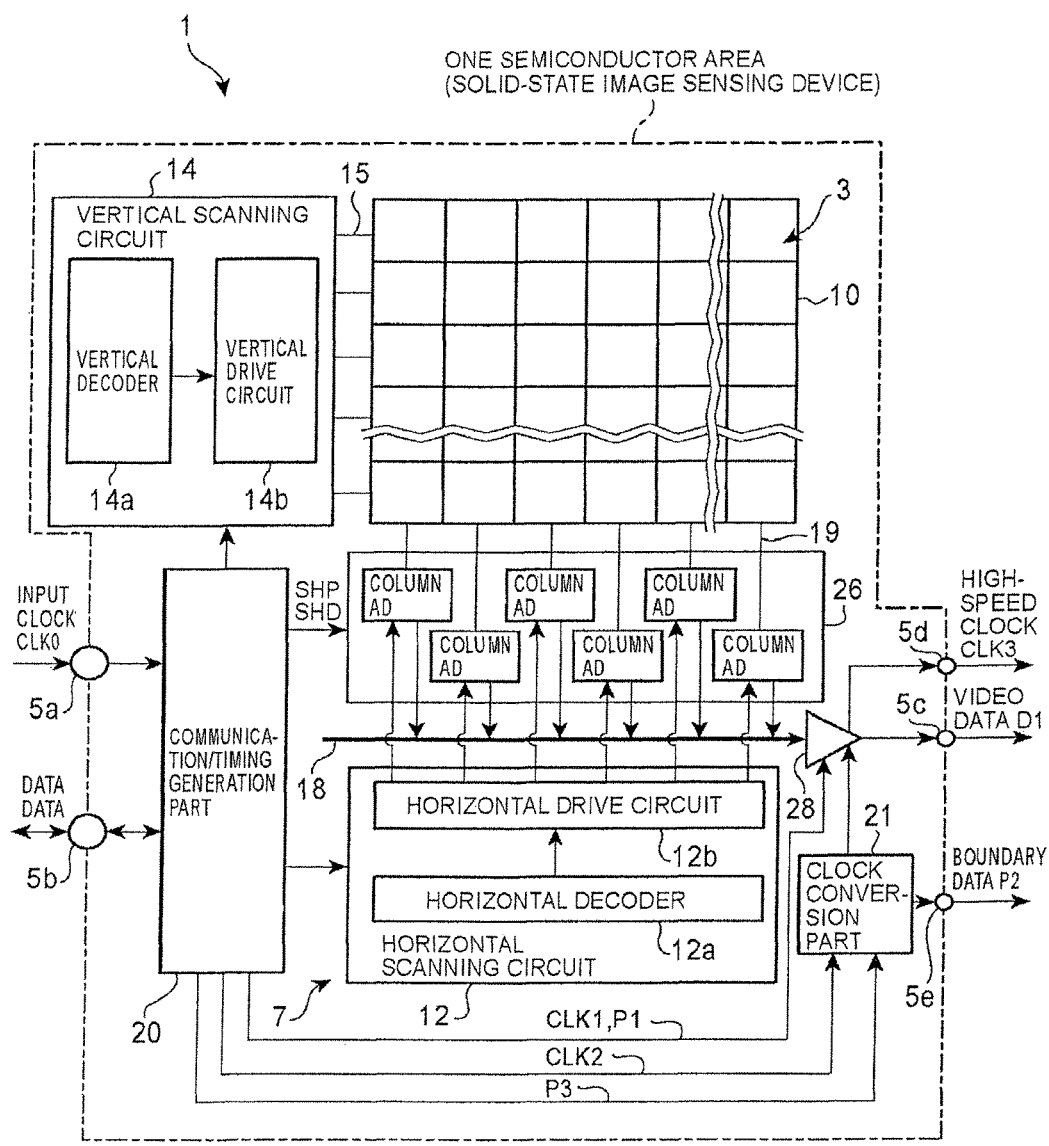
FIG. 1 is a schematic configuration diagram of a CMOS solid-state image sensing apparatus according to an embodiment of the present invention.
Figure 2A:
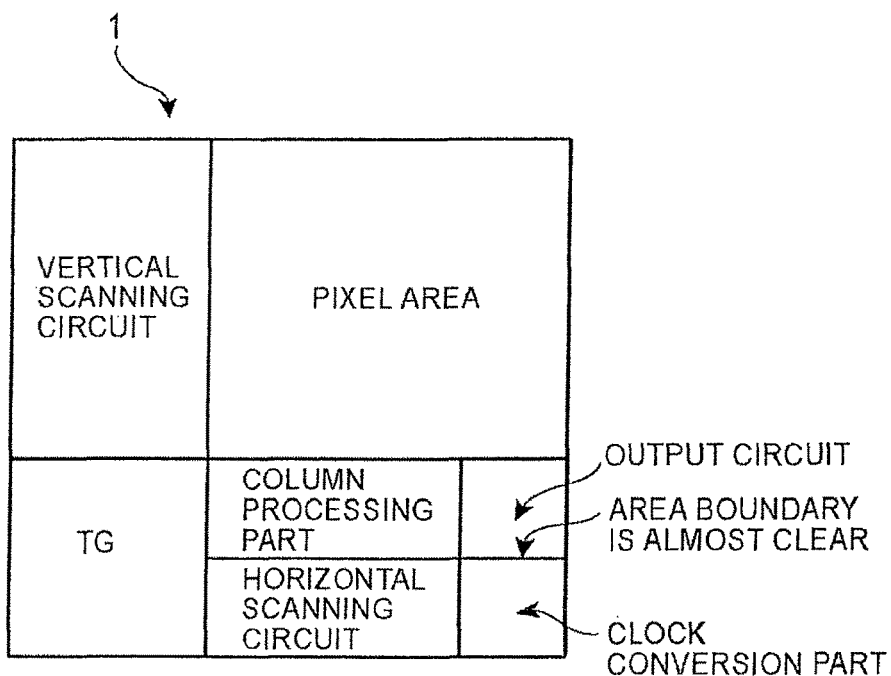
FIGS. 2A and 2B are explanatory diagrams illustrating examples of device disposition patterns of a clock-conversion part and an output circuit.
Figure 2B:
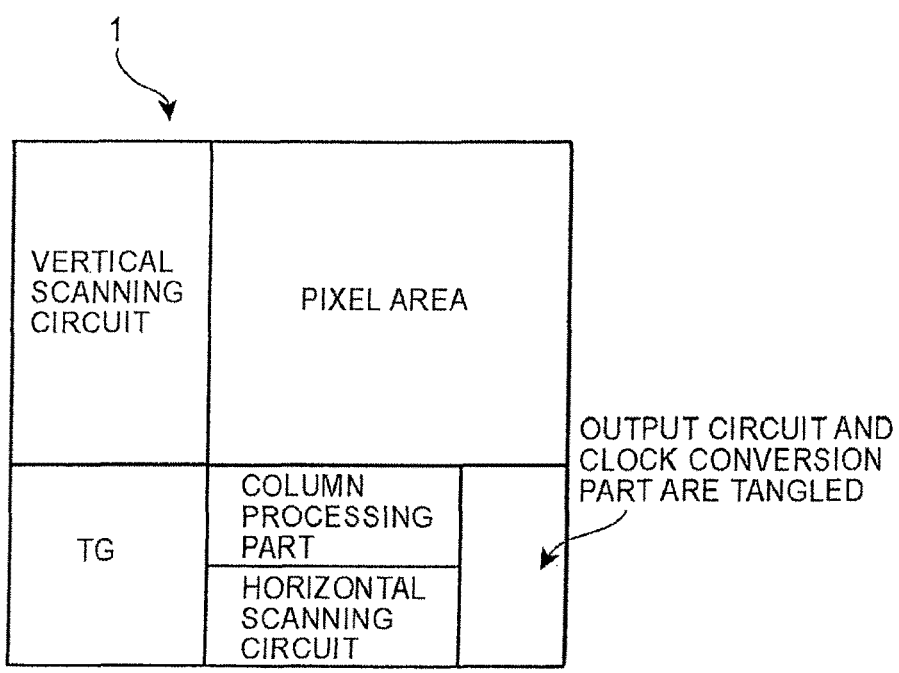
Figure 3A:
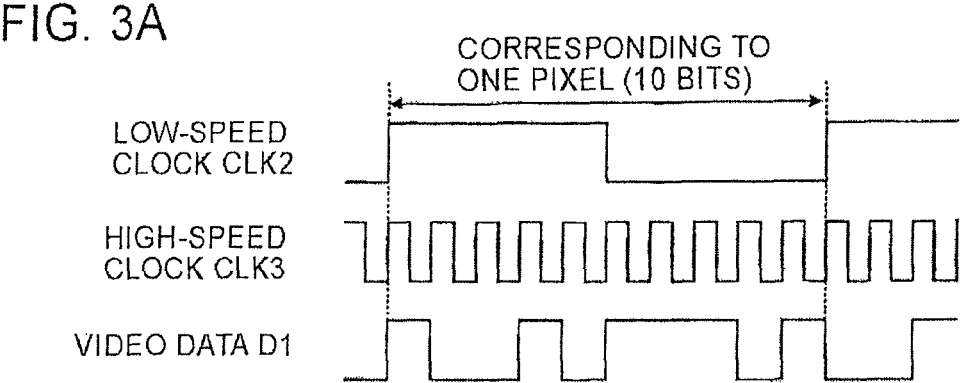
FIGS. 3A, 3B, and 3C are timing charts illustrating examples of data output methods.
Figure 3B:
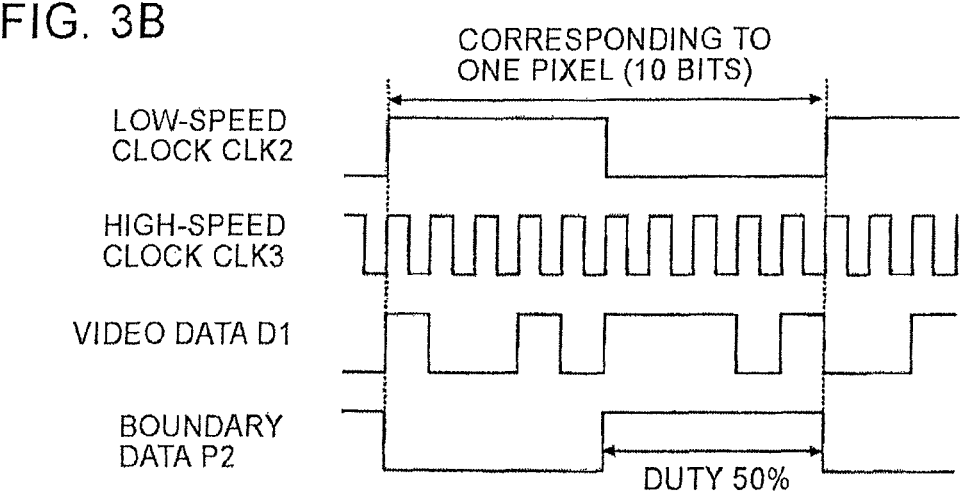
Figure 3C:
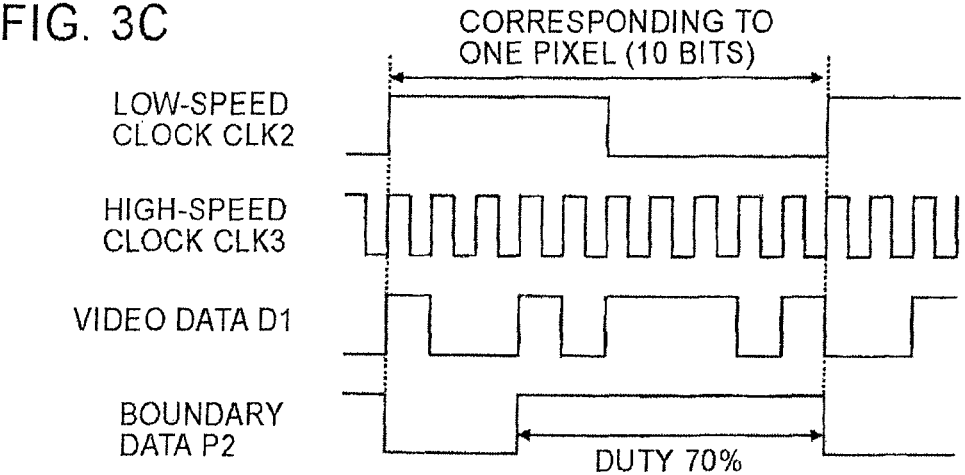

FIG. 1 is a schematic configuration diagram of a CMOS solid-state image sensing apparatus according to an embodiment of the present invention. Also, FIGS. 2A and 2B are explanatory diagrams illustrating examples of device disposition patterns of a clock-conversion part and an output circuit. Also, FIGS. 3A, 3B, and 3C are timing charts illustrating examples of data output methods.

A solid-state image sensing apparatus 1 is constituted so as to be applied to an electronic still camera capable of picking up color images. For example, in a still-image pickup mode, a mode for reading out all the pixels in sequence is set.

The solid-state image sensing apparatus 1 has a pixel area in which a plurality of pixels including a light receiving element (an example of an electric charge generation part) for outputting a signal in accordance with incident light amount are arranged in rows and columns (that is to say, in a two-dimensional matrix). The solid-state image sensing apparatus 1 is of a column type, in which a signal output from each pixel is a voltage signal, and a CDS (correlated double sampling) processing part and a digital conversion part are disposed for each column.

Specifically, as shown in FIG. 1, the solid-state image sensing apparatus 1 includes a pixel area (image sensing part) 10 in which a plurality of unit pixels 3 are arranged in rows and columns, a drive control part 7 disposed at the outside of the pixel area 10, and a column processing part 26. The drive control part 7 includes, for example, a horizontal scanning circuit 12, a vertical scanning circuit 14, a communication/timing generation part 20, and a clock-conversion part 21, which is an example of high-speed clock generation part and generates a pulse signal having a higher clock frequency than the frequency of an input clock signal.

In FIG. 1, a part of the rows and the columns are omitted for simplicity. However, in reality, tens of pixels to thousands of pixels are disposed. Also, as the other components of the drive control part 7, the horizontal scanning circuit 12, the vertical scanning circuit 14, and the communication/timing generation part 20 are provided. Each component of the drive control part 7 is integrally formed with the pixel area 10 in a semiconductor area of a monocrystal silicon, or the like, using the same technique as a semiconductor integrated circuit production technique, and is constituted as a solid-state image sensing device (image pickup device), which is an example of a semiconductor system.

The unit pixel 3 is connected to a vertical scanning circuit 14 for selecting a vertical column through a vertical control line 15, and a column processing part 26, in which column AD circuits are disposed for each column, through a vertical signal line 19, respectively. Here, the vertical control line 15 indicates overall wiring lines from the vertical scanning circuit 14 to the pixel.

The horizontal scanning circuit 12 and the vertical scanning circuit 14 include a decoder, respectively, as described below, and start shifting operation (scanning) in response to driving pulses given from the communication/timing generation part 20. Therefore, vertical control line 15 includes various pulse signals (for example, a reset pulse RST, a transfer pulse TRF, and a DRN control pulse DRN) for driving the unit pixel 3.

Although not shown in the figure, the communication/timing generation part 20 includes a function block of a timing generator TG (an example of a read-address controller) which supplies clock signals and predetermined timing pulse signals necessary for the operation of each part, and a function block of a communication interface which receives an input clock signal and command data for operation modes, etc., and outputs data including information of the solid-state image sensing apparatus 1. For example, a horizontal address signal is supplied to a horizontal decoder 12a, a vertical address signal is supplied to a vertical decoder 14a, and each of the decoders 12a and 14a receives the signal to select the corresponding row or column.

Also, in the communication/timing generation part 20 of the present embodiment, a clock CLK1 having the same frequency as an input clock signal (master clock) CLK0 input though a terminal 5a, a clock signal having a frequency half the frequency of the input clock signal, a low-speed clock signal having a further divided frequency are supplied to each part in the device, for example, the horizontal scanning circuit 12, the vertical scanning circuit 14, the column processing part 26, or a front stage side, that is to say, the side other than the signal processing system near the output terminal 5c of the output circuit 28. In the following, a clock signal having a frequency divided by two, and a clock signals having a frequency further divided are all put together to be called a low-speed clock CLK2.

The vertical scanning circuit 14 selects a row of the pixel area, and supplies a necessary pulse signal to the row. For example, the vertical scanning circuit 14 has the vertical decoder 14a for specifying (selecting a row of the pixel area 10) a reading row in a vertical direction, and a vertical drive circuit 14b for supplying a pulse signal to a control line for the unit pixel 3 on the reading address (row direction) specified by the vertical decoder 14a for driving. In this regard, the vertical decoder 14a selects a row for an electronic shutter in addition to a row for reading out a signal.

The horizontal scanning circuit 12 selects a column AD circuit of the column processing part 26 in synchronism with the low-speed clock in sequence, and leads the signal to the horizontal signal line 18. For example, the horizontal scanning circuit 12 has the horizontal decoder 12a for specifying (selecting an individual column circuit in the column processing part 26) a reading column in a horizontal direction, and a horizontal drive circuit 12b for leading each signal of the column processing part 26 to a horizontal signal line 18 in accordance with the reading address specified by the horizontal decoder 12a. In this regard, the horizontal signal lines 18 are disposed, for example, for the number of bits n (n is a positive integer) to be handled by the column AD circuit, for example, given 10 (=n) bits, 10 lines are disposed corresponding to the number of bits.

Clock Conversion Part

The clock-conversion part 21 contains a multiplication circuit which generates a pulse signal having a higher speed clock frequency than the input clock frequency. The clock-conversion part 21 receives a low-speed clock signal CLK2 from the communication/timing generation part 20, and generates a clock signal having a frequency two times or more the frequency based on that signal. In the following, all the clock signals having a frequency two times or more the frequency of the low-speed clock CLK2 are called a high-speed clock signal. Here, in particular, the signal is called a high-speed clock signal CLK3 by adding a reference code CLK3. The clock-conversion part 21 supplies a low-speed clock CLK2 received from the communication/timing generation part 20, and the high-speed clock signal CLK3 generated by the clock-conversion part 21 to the output circuit 28, which is an example of the data-output part.

Here, it is assumed that the high-speed clock signal CLK3 has a frequency two times or more the frequency of the low-speed clock CLK2. However, it is not limited to an integer multiple, and the other multiple other than an integer multiple may be used. Note that it is preferable to set this to an integer multiple from the point of data connectivity.

It is preferable to allow changing the frequency of the high-speed clock signal CLK3 by an external command through the communication/timing generation part 20, which performs a communication function with the outside. In this case, it is preferable that a frequency switching command P3 should be automatically switched depending on the operation mode, for example, a still-image sensing mode, an action sensing mode, or additional read-out mode.

For example, it is preferable that the frequency of the high-speed clock signal CLK3 generated by the clock-conversion part 21 should be switched by the communication/timing generation part 20 receiving an instruction of an operation mode from the central control part outside of the device and issuing the frequency switching command P3 to the clock-conversion part 21 in conjunction with this operation mode.

Alternatively, the frequency switching command P3 issued from the central control part outside of the device for the clock-conversion part 21 is notified independently (directly in reality) from an operation mode, and thus the frequency may be automatically switched by this notification. In this regard, in this case of the structure according to the present embodiment, the communication function with the outside is disposed in the communication/timing generation part 20, and thus the frequency switching command P3 is notified to the clock-conversion part 21 through the communication/timing generation part 20. Note that the structure is not limited to this. The structure may be such that by the clock-conversion part 21 having a communication function with the outside, the clock-conversion part 21 directly communicates with the outside.

In this regard, the clock-conversion part 21 may be disposed in the TG block (not shown in the figure). However, the clock-conversion part 21 and the wiring lines of the high-speed clock signal CLK3 therefrom cause noises to occur, and thus it is preferable that the clock-conversion part 21 and the output circuit 28 are individually designed, and are disposed with being adjacent to each other at the output side of the device. In this case, as shown in FIG. 2A, it is preferable that the border part of each part should be partitioned nearly a rectangle in shape, and thus both parts should be adjacently disposed, leaving no space between them.

Also, it is further preferable to design the device so as to integrate the clock-conversion part 21 and the output circuit 28 as one block to be disposed at the output side. By virtually disposing both of the parts together as one unit, and, for example, unlike in a state, as shown in FIG. 2B, in which each of the parts is tangled and both of the boundary parts can be determined, an advantage in that signals having close relationship can be connected at a minimum distance is obtained.

For a multiplication circuit of the clock-conversion part 21, assuming that k1 is a multiple of the frequency of the low-speed clock CLK2, a k1-multiplication circuit should be provided, and thus various known techniques can be used. For example, the known technique of Japanese Unexamined Patent Application Publication No. 2003-8435, Japanese Examined Patent Application Publication No. 3360667, Paragraphs 6 and 7, and as described in FIG. 10, a circuit technique of a PLL frequency synthesizer using a PLL (phase lock loop) can be used. By using a method of PLL, the high-speed clock signal CLK3 can be phase-locked with the low-speed clock CLK2. Also, not only the method using PLL, a known circuit technique described in Japanese Examined Patent Application Publication No. 3366223 can be used.

Alternatively, as described in "Description of frequency multiplication circuit, [online], [searched on Jun. 20, 2003], the Internet <URL: http://www.nakaco.co.jp/technical/Freq-multiplier.pdf", a circuit technique of mode in which amplification is repeated using a band-pass filter can be used. By using this method, based on the low-speed clock CLK2 as an original oscillation, all the frequencies ranging to a multiplied high-speed clock signal CLK3 can be covered. Also, a high-speed clock signal, which has less noise and is relatively pure compared with the method of multiplication by a PLL circuit, can be obtained.

In the solid-state image sensing apparatus 1, the pixel signal output from the unit pixel 3 is supplied to the column AD circuit of the column processing part 26 for each vertical column through the vertical signal line 19. The column AD circuit of the column processing part 26 receives the pixel signal for one column, and processes the signal. For example, the column AD circuit performs processing to obtain a difference of the signal level between the pixel signal of the voltage mode input through the vertical signal line 19 and the signal level (noise level) immediately after the pixel reset based on two sampling pulses, a sampling pulse SHP and a sampling pulse SHD which are given from the communication/timing generation part 20. Thus a noise signal component, which is called a fixed pattern noise (FPN) or a reset noise, is eliminated. In this regard, in the back stage of the column processing part 26 can be provided with an AGC (auto gain control) circuit having a signal amplification function, etc. as necessary in the same semiconductor area as the column processing part 26.

Also, each column AD circuit has an ADC (analog digital converter) circuit which converts a processed analog signal into 10-bit digital data using, for example, the low-speed clock CLK2. Here, the digitized pixel data is transmitted to the horizontal signal line 18 through a horizontal selection switch, which is driven by the horizontal selection signal from the horizontal scanning circuit 12, not shown in the figure, and further input into the output circuit 28. In this regard, 10 bits are one example, and the other number of bits, such as less than 10 bits (for example, 8 bits), or the number of bits exceeding 10 bits (for example, 14 bits) may be used.

Also, here the AD conversion function is provided for each column circuit to convert the data into the digital data for each vertical column. However, this AD conversion function can be provided not only in the column circuit portion, but also in the other portion. For example, a structure in which the AD conversion function is individually provided for each pixel of the pixel area (multiple functions are provided) may be used. Alternatively, an analog pixel signal may be output as far as the horizontal signal line 18, and the AD conversion may be performed thereafter to pass the data to the output circuit 28.

In any structure, a pixel signal of each vertical column for each row is output in sequence from the pixel area 10 in which light receiving elements as electric charge generation parts are arranged in a matrix. One piece of image corresponding to the pixel area 10, in which light receiving elements are arranged, that is to say, a frame image is represented by a set of pixel signals of the entire pixel area 10.

First Example of Output Circuit

Here, in the output circuit 28 of a first example, pixel data D0 from the horizontal signal line 18 is buffered using the low-speed clock CLK2 and the high-speed clock signal CLK3 supplied from the clock-conversion part 21, or the clock signal CLK1 and the other pulse signal P1 from the communication/timing generation part 20, and is externally output as video (image pickup) data D1. In this regard, as described below, the video data D1 may be output after performing, for example, black-level adjustment, column difference correction, signal amplification, color relation processing, signal compression processing, and the like.

When outputting data based on the high-speed clock signal CLK3, first, the output circuit 28 fetches pixel data (for example, 10-bit data) from the column processing part 26 as parallel data in synchronism with the low-speed clock CLK2. Thereafter, as shown in FIG. 3A, the output circuit 28 converts the data into serial-format data in synchronism with either a rising edge or a falling edge of the high-speed clock signal CLK3 (a rising edge in the figure). For a circuit configuration for converting parallel-format data to serial-format data (in the following, referred to as parallel-serial conversion), a known parallel-serial conversion circuit can be used. Also, as described below, the same configuration as that of a switching part 284 can be used.

Here, assuming that the pixel data D0, which is represented by n bits/parallel for each one cycle of the low-speed clock CLK2 is output from each column AD circuit of the column processing part 26 to be fetched by the signal processing part 282, the high-speed clock signal CLK3 must have sufficient frequency for converting this data into serial-format data in the same time period. Specifically, the frequency is necessary to be at least a multiple of the number of bits, that is to say, n times (in this example, n=10) or more the frequency of the low-speed clock CLK2. It is not necessary to have a very high frequency needlessly. Here, as shown in FIGS. 3A, 3B, and 3C, it is assumed that the frequency of the high-speed clock signal CLK3 is 10 times the frequency of the low-speed clock CLK2.

Also, the output circuit 28 is preferable to have a high-speed clock signal output function which outputs the high-speed clock signal CLK3 generated by the clock-conversion part 21 from a terminal other than the data terminal in addition to a function of outputting the video data D1 from the output terminal 5c. For example, the bit data of the image pickup data D0 or the video data D1 is output from the terminal 5c in sequence as serial-format data in synchronism with a rising edge, and the high-speed clock signal CLK3 used at this time is output from the terminal 5d. At this time, the high-speed clock signal CLK3 is output in consideration of a delay with the video data D1. The consideration for a delay means that the data switching position of each bit of the video data D1 in a serial format is maintained to have a constant relationship with each edge of the high-speed clock signal CLK3 (for example, to have the same position). This is the same in the following.

In this manner, by operating the pixel area 10 and the column processing part 26 at a low speed using a low frequency as the input clock CLK0, and operating only the output circuit 28 at a high speed, it is possible to limit the circuit portion to be operated at a high speed to a minimum range, and thus to reduce power consumption. Also, the connection from the front-stage circuit or IC (integrated circuit), to which the input clock CLK0 is supplied, to the solid-state image sensing apparatus 1 becomes easy.

In addition, in this embodiment, the clock-conversion part 21 is disposed in the vicinity of the output circuit 28 which performs the parallel-serial conversion function requiring the high-speed clock signal CLK3, and the high-speed clock signal CLK3 is generated in the vicinity of the output circuit 28. Thus it is not necessary to wire a high-speed line, and it is possible to prevent the influence of noises to the operations of the pixel area 10 and the column processing part 26. Also, since a high-speed line need not be wired, and a high-speed line can be maintained in the vicinity of the output circuit 28, the problem of unnecessary radiation can be subdued. For example, the interference of unnecessary radiation on the video data D1 to cause noises is reduced.

Using the CMOS-sensor type solid-state image sensing apparatus 1 having such a structure, by operating the pixel area and the column circuit at a low frequency and performing parallel-serial conversion thereafter using the high-speed clock signal at the output portion, it is possible to perform high-speed operation with a few terminals at the output portion. Thus an increase in power consumption can be prevented, and noises are reduced. Also, since the input clock signal from the outside to the image pickup device has a low frequency, the loss from the front stage to the CMOS sensor is kept small, and unnecessary radiation can be subdued. Therefore, it is possible to produce a small camera (animation, still image) which is reliable and inexpensive.

For example, in the solid-state image sensing device of the VGA (about 300 thousand pixels), assuming that the frequency of the input clock is 24 MHz, and the circuits other than the output circuit 28 are operated at 12 MHz or 24 MHz (low-speed clock), using the high-speed clock signal CLK3 of 120 MHz from the single output terminal 5c of the output circuit 28, the 10-bit video data D1 is serially output at a frame rate of 30 fps (frame/s).

Since the most part of the image sensing device operates at 12 MHz, even if the output rate is 120 MHz, there is almost no effect on the power consumption. In general, a solid-state image sensing apparatus is an analog circuit which is a very accurate and sensitive to a noise of 1 mV or less. At the same time, in particular, the pixels, which accept light, maintain the photoelectric transferred electric charge for a certain period of time, and output the charge, must have the uniform characteristics among about 300 thousand pieces in the VGA class, and among millions of pieces in mega pixels in these orders. This accuracy needs to be maintained in the same manner for the column processing part 26, which has fewer parts, that is, hundreds or thousands of parts, compared with the number of pixels.

Accordingly, it is necessary for the pixel area 10 and the column processing part 26 to decrease the frequency as much as possible to reduce white noises, and to operate at a low frequency as much as possible to eliminate irregularity of the pulse delay, etc. depending on the places.

Furthermore, as desired output image information, images of hundreds of thousands to millions of pixels×10 bits must be output at tens to thousands of pieces per second. In addition, in order to mount the parts on a small apparatus such as a mobile phone, a FDA (personal digital assistant), there is a demand that the parts are produced as small as, as inexpensive as, and as reliable as possible. Thus the number of output terminals needs to be reduced, and the connection load to the next stage LSI needs to be small.

Here, the solid-state image sensing apparatus communicates with the outside in order to switch the output mode and to make a confirmation. However, this data amount is very little in comparison with the output data. In such a solid-state image sensing apparatus, the structure of this embodiment, in which a low frequency is received as an input clock, the pixel area 10 and column processing part 26 are operated at a low frequency, and only the output circuit 28 is operated at a high frequency, is very effective.

In this regard, in addition to the video data D1, the high-speed clock signal CLK3 is also output from the terminal (in this embodiment, 5d) other than the data output terminal (in this embodiment, 5c) in consideration of a delay from the video data D1, and thus the data receiving side at the outside of the device can fetch the video data D1 in synchronism with the high-speed clock signal CLK3, thereby preventing error.

In this manner, when the high-speed clock signal CLK3 is output together with the video data D1, the specification against the jitters of the high-speed clock signal CLK3 is loosened. Thus a PLL can be made small. However, in order to prevent the influence of jitters, it is preferable that the high-speed clock signal CLK3 is not used in the portion of handling analog signals, for example, the pixel area 10 and the column processing part 26.

In this regard, in the same manner as the technique used in communication field, by employing the data pattern in which serial-format data is used and the clock is embedded in the data (for example, as a synchronization signal), the video data D1 and the high-speed clock signal CLK3 can be virtually output from the common terminal. Thus the interface terminal and wiring line can be reduced.

Also, in addition to outputting the high-speed clock signal CLK3, as shown in FIG. 3B, boundary data P2 indicating a delimiter of one pixel data may be output from the terminal 5e other than each of the terminals 5c and 5d of the video data D1 and the high-speed clock signal CLK3 as data having a lower frequency than the high-speed clock signal CLK3. For example, in this embodiment, a clock having the same frequency as the low-speed clock CLK2, which indicates the start or the end of the 10-bit video data D1 may be output as the boundary data P2.

This is because when serial-format data is output, if the data delimiter of one pixel is not correctly recognized, at the receiving side, a correct image cannot be reproduced as a matter of course. When a data rate of tens of MHz is used, there is little possibility of causing an error. However, the higher the speed, more complicated it becomes. Thus it is preferable to have identification information in order to prevent an error. That is to say, when the frequency is low, since the follow-up feature of the receiving side can be obtained without using the boundary data P2, and thus one pixel data in the serial-format data can be correctly recognized. However, when the frequency is high, the possibility of making an error in delimiting one pixel data increases due to instability of the data reproduction. In addition, if an error occurs, the error is carried on into the subsequent pixels. Therefore the impact is enormous, and thus it is highly effective to use the boundary data P2 having a frequency lower than the frequency of the high-speed clock signal CLK3.

In this regard, the boundary data P2 may be generated in any part, for example, in the TG block of the communication/timing generation part 20, the clock-conversion part 21, or the signal processing part 282 described below. Also, in FIG. 3B, the duty thereof (=a high period/one cycle) is set to 50%, and the boundary data is virtually the data having the opposite polarity to the low-speed clock CLK2. However, it is not limited to this, and as shown in FIG. 3C, the duty may be changed to a value other than 50%.

Variation of First Example of Output Circuit

Figure 4:
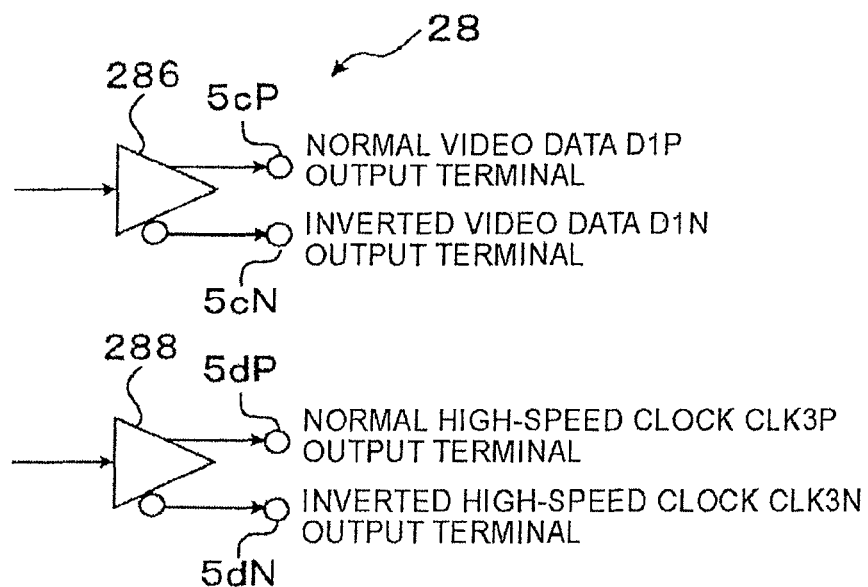
FIG. 4 is a circuit block diagram illustrating a variation of a first example structure of the output circuit.
Figure 5:
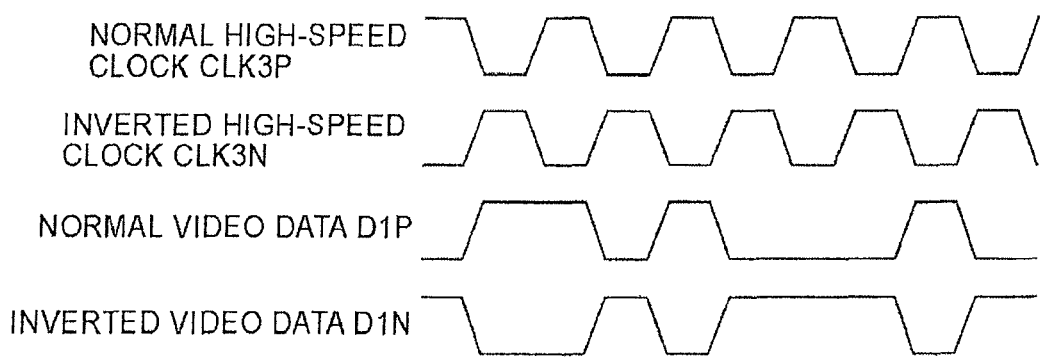
FIG. 5 is a timing chart illustrating the data output method in the variation of the first example.

FIG. 4 is a circuit block diagram illustrating a variation of a first example structure of the output circuit. In this regard, here, only the vicinity of the output buffer is illustrated. Also, FIG. 5 is a timing chart illustrating the data output method in this variation. This variation has a characteristic structure in which the serial-format output data for n bits and the high-speed clock signal CLK3 are differentially output from the two output terminals, respectively.

Accordingly, as shown in FIG. 5, the output buffer 286 of the output circuit 28 has a function of differential conversion part which converts the received data into differential-format data including normal video data D1P having the same polarity as the video data D1 and inverted video data DIN having the opposite polarity based on the n-bit (in this example, 10) video data D1, represented in a serial format, generated by the switching part 284 having a function of a parallel-serial conversion part. The output buffer 286 having a function of the differential conversion part has an output terminal 5cP for externally outputting a normal video data D1P and an output terminal 5cN for externally outputting the inverted video data D1N. The output buffer externally outputs differential outputs of the normal video data D1P and the inverted video data D1N from the corresponding two output terminals 5cP and 5cN, respectively.

In the same manner, an output buffer 288 other than the output buffer 286 has a function of differential conversion part which converts the received data into differential-format data including a normal high-speed clock signal CLK3P having the same polarity as the high-speed clock signal CLK3 received through the switching part 284 and an inverted high-speed clock signal CLK3N having the opposite polarity. The output buffer 288 has an output terminal 5dP for externally outputting a normal high-speed clock signal CLK3P and an output terminal 5dN for externally outputting the inverted high-speed clock signal CLK3N. Then the output buffer 288 externally outputs the high-speed clock signal CLK3 input through the switching part 284 in consideration of a delay with the video data D1, and the inverted high-speed clock signal CLK3N in consideration of a delay with the inverted video data DiN from the corresponding two output terminals 5dP and 5dN, respectively as differential outputs of the high-speed clock signal CLK3 and the inverted high-speed clock signal CLK3N.

When data output is performed at high-speed clock frequency in this manner, in addition to a method of outputting using either a rising edge or a falling edge of the high-speed clock as shown in FIGS. 3A, 3B, and 3C, it is possible to use both a rising edge and a falling edge of the high-speed clock signal CLK3 as shown in FIG. 5. Thus, it is possible to virtually output at a frequency double (double the output rate) the original frequency. On the contrary, when using the same output rate, the frequency can be half the frequency of the high-speed clock signal CLK3.

In this manner, each of the differential outputs is output from the terminals (in this example, 5dP and 5dN) different from the data output terminals (in this example, 5cP and 5cN) in consideration of a delay with the video data D1P and D1N. It is, therefore, possible to fetch the video data D1P and DiN for any of the differential outputs in synchronism with the corresponding high-speed clock signal CLK3P and CLK3N at the data receiving side of the outside of the device, and thus an error can be prevented.

Second Example of Output Circuit

Figure 6:
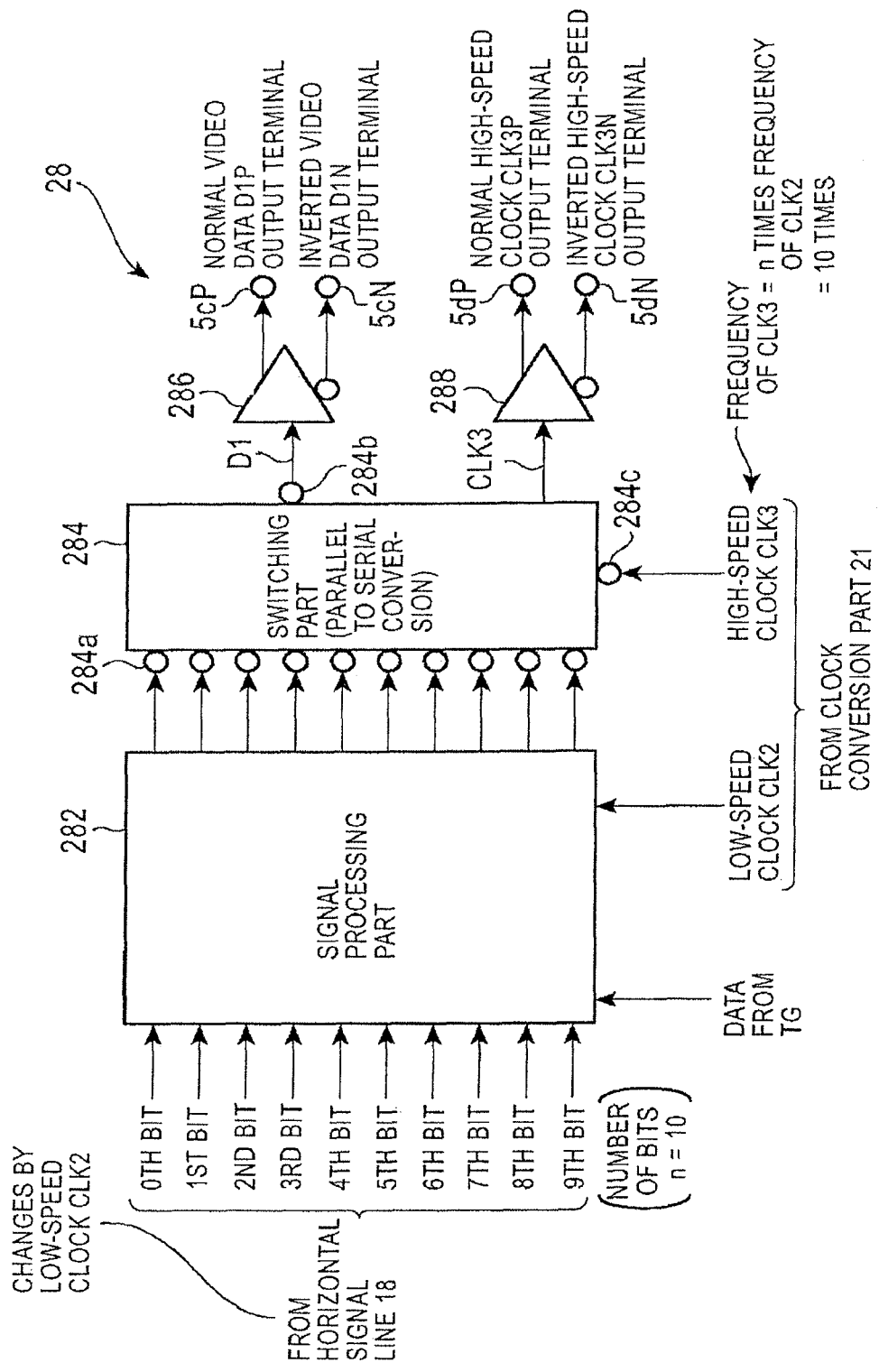
FIG. 6 is a circuit block diagram illustrating a second example structure of the output circuit.
Figure 8A:
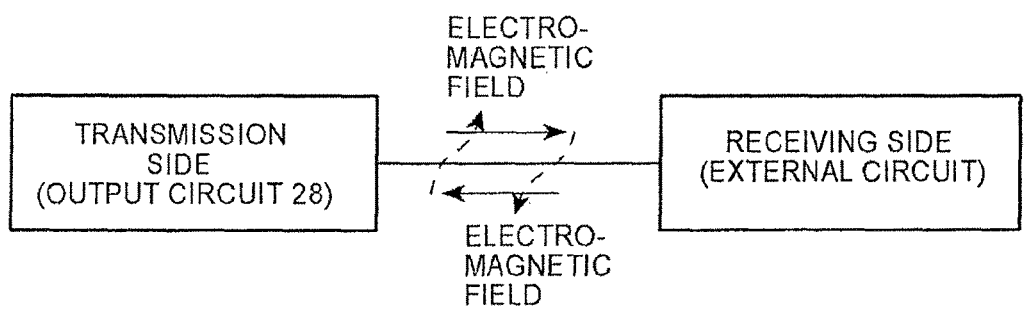
FIGS. 8A and 8B are explanatory diagrams for the improvement effects of unnecessary radiation of the output circuit of the second example.
Figure 8B:
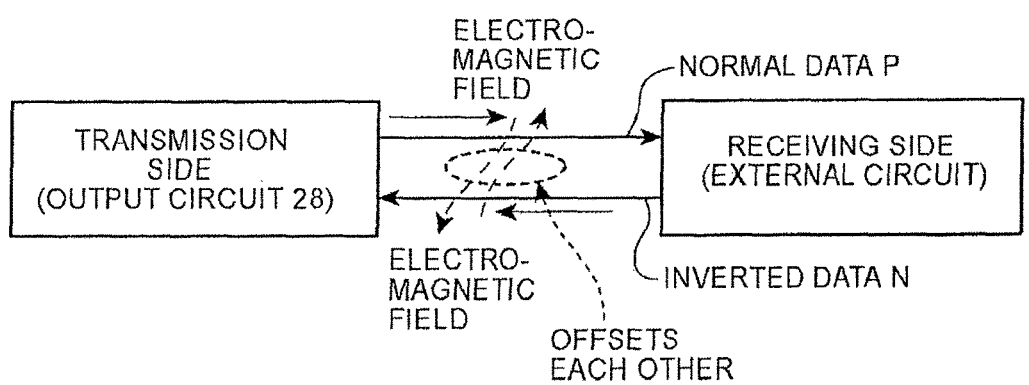

FIG. 6 is a circuit block diagram illustrating a second example structure of the output circuit. Also, FIG. 7 is a circuit block diagram illustrating a variation of the output circuit of the second example. Here, FIG. 6 illustrates an application to a differential output, and FIG. 7 illustrates an application to a single output. Also, FIGS. 8A and 8B are explanatory diagrams for the improvement effects of unnecessary radiation of the output circuit 28 of the second example.

The output circuit 28 of the second example shown in FIG. 6 has a characteristic in that the digital signal processing part is contained inside and the differential output is used. In contrast, the variation of the second example shown in FIG. 7 contains the digital signal processing part inside in common with the second example. However, it is different from the second example in that single output is used. In the following, a specific description will be given.

The output circuit 28 of the second example shown in FIG. 6 has a signal processing part 282, which performs processing on the 10-bit digital data D0 input from the horizontal signal line 18, a switching part 284, and output buffers 286 and 288.

The signal processing part 282 receives the input of predetermined data from the TG block of the communication/timing generation part 20, and the low-speed clock CLK2 from the clock-conversion part 21. Also, the switch part 284 receives the input of the high-speed clock signal CLK3 from the clock-conversion part 21.

The signal processing part 282 fetches the pixel data D0 in parallel from 10 horizontal signal lines 18 in synchronism with the low-speed clock CLK2. This is the same as the output circuit 28 of the first example. The signal processing part 282 performs black-level adjustment, column difference correction, signal amplification, color relation processing, signal compression processing, and the like on the fetched data D0 using, for example, the same low-speed clock CLK2. Then the signal processing part 282 inputs the processed 10-bit data D1 for each bit into the different input terminal of the switching part 284.

The switching part 284 includes a multiplexer (multiple-inputs and one-output switch; details are omitted), and parallel-format data from the signal processing part 282 is individually input into each of a plurality of input terminals 284a of the multiplexer. Any one of each data input into the plurality of input terminals 284a is selected to be output from the output terminal 248b. The high-speed clock signal CLK3 from the clock-conversion part 21 is input into a control terminal 284c of the multiplexer as a switching command. By using a multiplexer having such a structure, it is possible to achieve parallel-serial conversion with a simple circuit structure.

The switching part 284 having such a structure selects each one bit from 10-bit data input from an individual terminal using the high-speed clock signal CLK3 as a switching command in accordance with a predetermined sequence to output from the output terminal 248b. Thus switching part 284 converts the parallel data into serial-format data (in the following, referred to parallel-serial conversion). Then switching part 284 leads the video data D1 after the parallel-serial conversion to the data output buffer 286. Also, the switching part 284 leads the high-speed clock signal CLK3 used at the parallel-serial conversion to the clock output buffer 288.

The output buffers 286 and 288 have a function of the differential conversion part in the same manner as the variation of the first example. For example, the output buffer 286 externally outputs the differential output of the normal video data D1P and the inverted video data DIN from the corresponding two output terminals 5cP and 5cN, respectively. In the same manner, the output buffer 288 outputs the high-speed clock signal CLK3 in consideration of a delay with the video data D1, and the inverted high-speed clock signal CLK3N in consideration of a delay with the inverted video data DIN as the differential output of the high-speed clock signal CLK3 and the inverted high-speed clock signal CLK3N from the corresponding two output terminals 5dP and 5dN, respectively.

For example, in the same manner as the first example, in the solid-state image sensing device of the VGA (about 300 thousand pixels), assuming that the frequency of the input clock is 24 MHz, and the circuits other than the output circuit 28 are operated at 12 MHz or 24 MHz (low-speed clock), using the high-speed clock signal CLK3 of 120 MHz from the two differential output terminals 5cP and 5cN of the output circuit 28, the 10-bit video data D1 is serially output at a frame rate of 30 fps (frame/s).

In this regard, the variation of the second example shown in FIG. 7 is different only in the point that the output buffers 286 and 288 are single output, and thus a description of the circuit structure and the operations thereof will be omitted.

In the same manner as in the first example, in the output circuit 28 of the second example shown in FIG. 6, data input into the output circuit 28 is performed in synchronism with the low-speed clock CLK2. On the other hand, the output of the video data D1 is performed in synchronism with the high-speed clock signal CLK3. Also, in the same manner as in the first example, the high-speed clock signal is also output. Thus, although there is a difference of whether single output or differential output, in the output circuit 28 of the second example, the same effects as that of the first example described above can be basically obtained.

Also, in the output circuit 28 of the second example shown in FIG. 6, special effects due to the differential output can be obtained. That is to say, an abnormal component in the pulse waveform, such as dullness, ringing, etc., is apt to occur with an increase of the speed of the signal. In single output using either one output, the output signal directly undergoes the effects. In contrast, by using differential output, it becomes possible to reproduce the waveform using both differential outputs, and thus noise-withstandingness is improved. This is not limited to the data D1, and is the same for the high-speed clock signal CLK3. Therefore, the second example, which has employed the differential output, has a structure capable of coping with a higher frequency than the structure of the first example. On the contrary, for a medium-speed frequency, it may be sufficient to use the first example, which has employed the single output.

Also, for the structure of the second example, it is possible to use a structure (LVDS: low voltage differential signaling) in which differential interface in current mode is employed. In this way, it becomes advantageous against the problems of noise-withstandingness and unnecessary radiation. For example, when an interface of single output in current mode is employed as the variation of the second example shown in FIG. 7 and in the first example structure, as shown in FIG. 8R, a current goes and comes back (the timing is not simultaneous) between the output circuit 28 at the transmission side and the next-stage circuit and the next-stage IC at the receiving side. Thus, at each time, an electromagnetic field causing unnecessary radiation occurs, affecting peripheral circuits and the outside of the solid-state image sensing apparatus 1.

In contrast, when an interface of differential output in current mode using the normal data P and the inverted data N is employed as shown in the structure of the second example, as shown in FIG. 8B, although a current goes and comes back between the output circuit 28 at the transmission side and the next-stage circuit and the next-stage IC at the receiving side, the timing is always simultaneous, and thus the electromagnetic fields occur in the directions opposite to each other. Accordingly, the electromagnetic fields which have occurred cancel each other. Thus the electromagnetic field causing unnecessary radiation is considered not to occur on the whole. In this regard, in order to improve these effects, the interface between the output circuit 28 and the external circuit in which two differential output lines are close to each other, is employed. For this purpose, for example, a connection line having a twisted-pair structure should be used.

Third Example of Output Circuit

Figure 9:
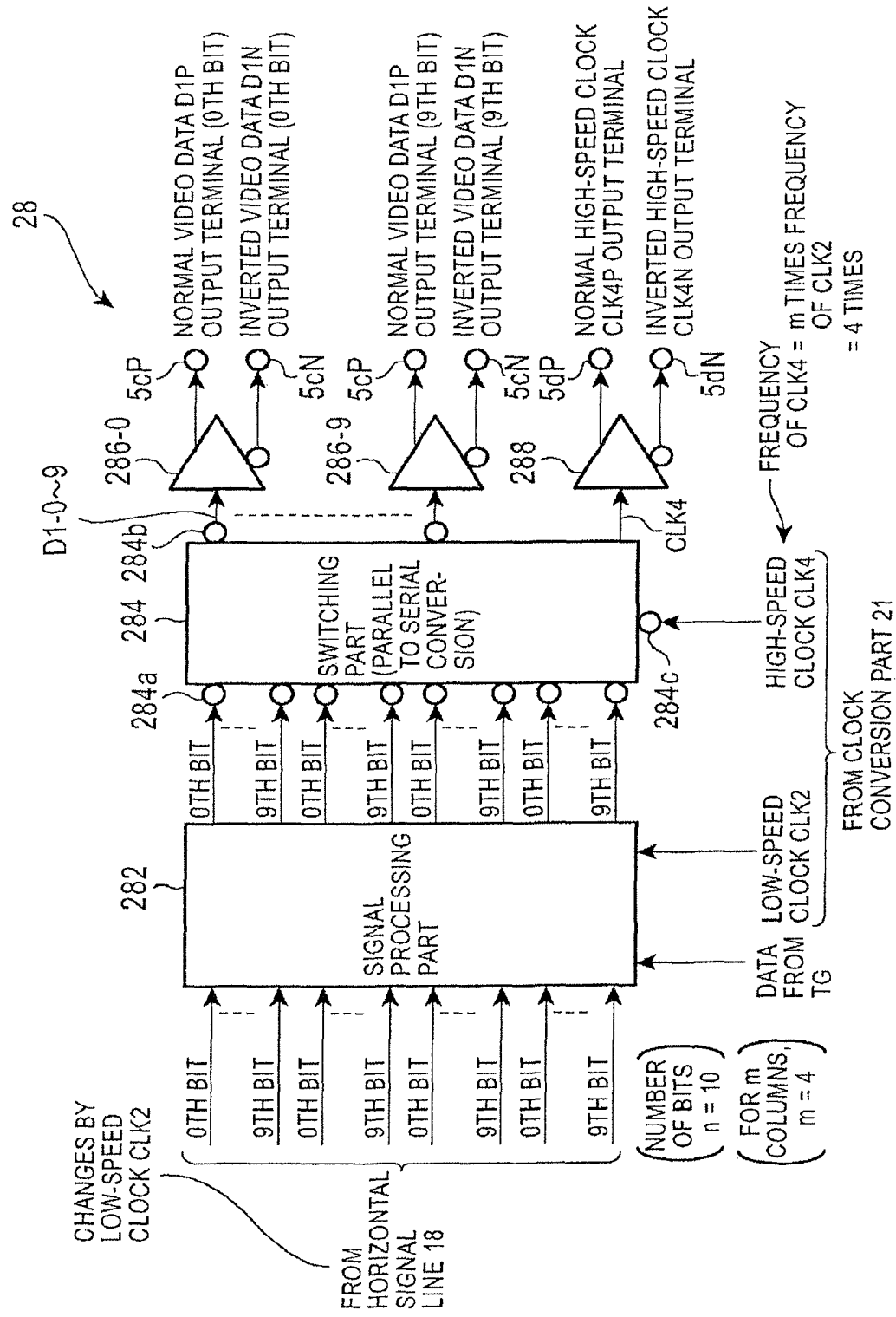
FIG. 9 is a circuit block diagram illustrating a third example structure of the output circuit.
Figure 10:
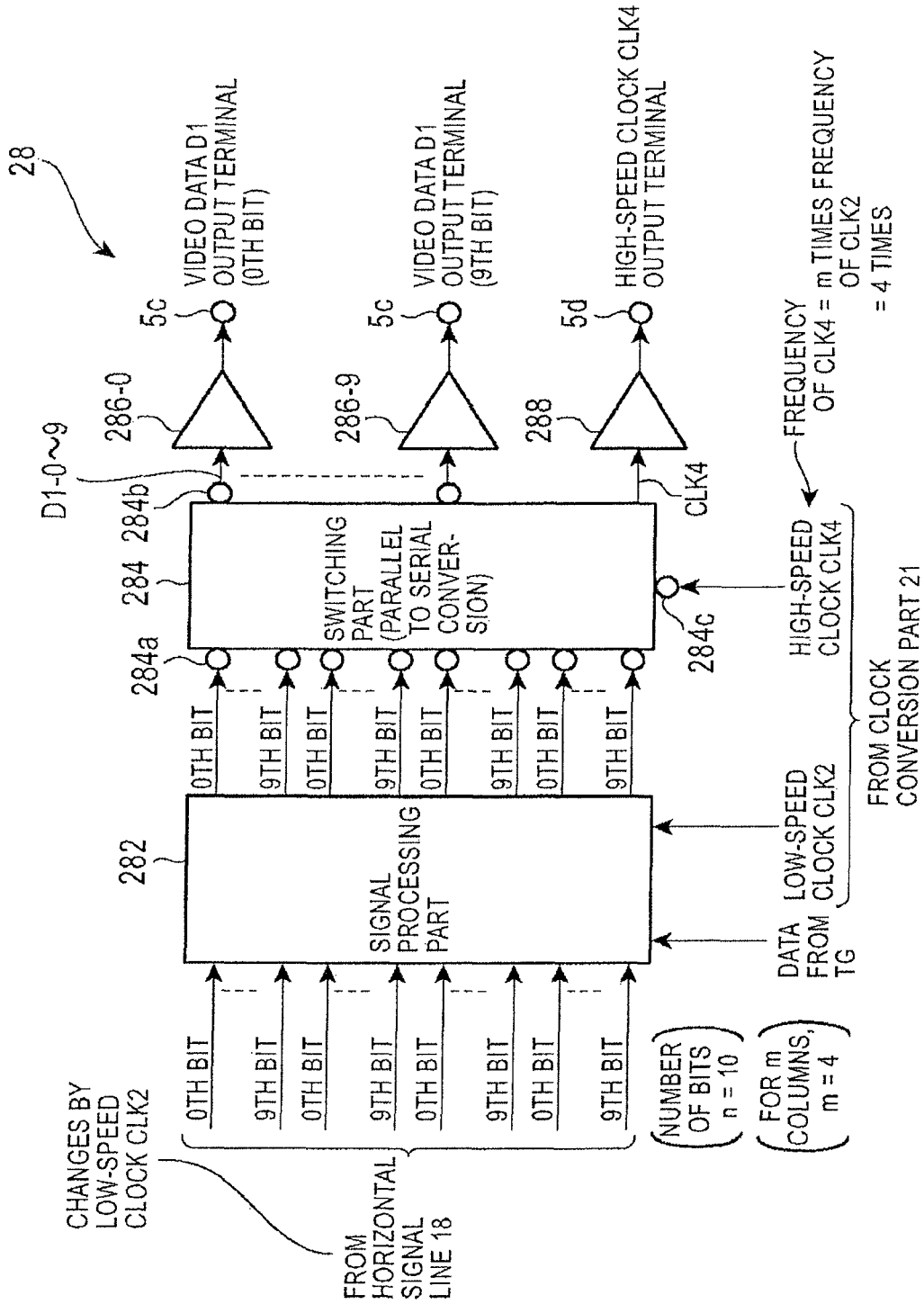
FIG. 10 is a circuit block diagram illustrating a variation of the output circuit of the third example.
Figure 11:
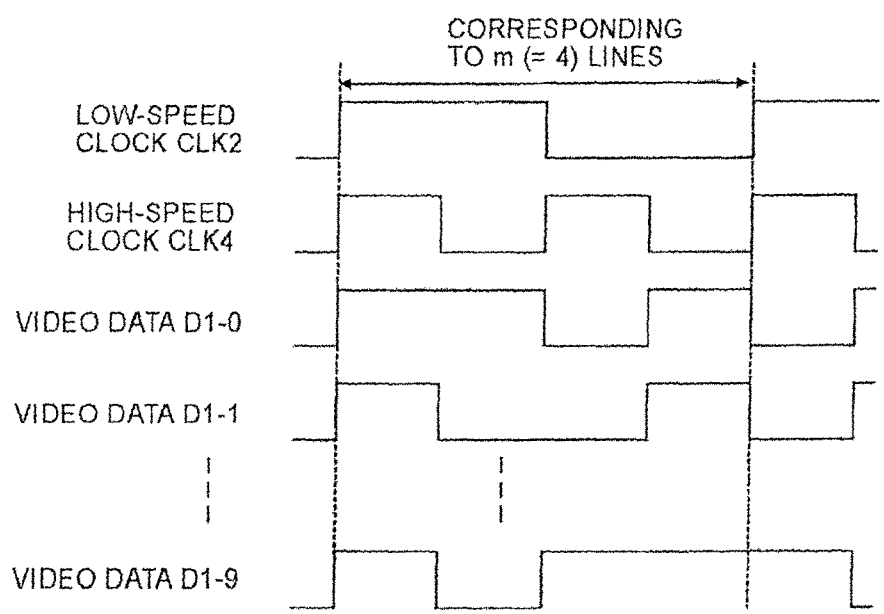
FIG. 11 is a timing chart illustrating a data output method in the third example and the variation thereof.

FIG. 9 is a circuit block diagram illustrating a third example structure of the output circuit. Also, FIG. 10 is a circuit block diagram illustrating a variation of the output circuit of the third example. Here, FIG. 10 illustrates an application to a differential output, and FIG. 11 illustrates an application to a single output. Also, FIG. 11 is a timing chart illustrating the data output method in the third example and the variation thereof.

Here, in the same manner as the second example, the output circuit 28 of the third example shown in FIG. 9 has a characteristic in that the digital signal processing part is contained inside and the differential output is used. Also, in the column processing part 26, the data of n (n is a positive integer) bits for m columns (m is a positive integer of 2 or more) can be simultaneously output. In contrast, the variation of the third example shown in FIG. 10 contains the digital signal processing part inside, the differential output is used, and the data for m column in the column processing part 26 can be simultaneously output in common with the third example. However, it is different from the third example in that single output is used in the same manner as the variation of the second example. In the following, a specific description will be given.

Here, as a specific example, an example is shown of the case including 40 horizontal signal lines 18 in order to simultaneously output the data for 4 (=m) columns of 10 (=n)-bit column AD circuits. In this case, the pixel data D0 of 40 bits in total is signal processed in the signal processing part 282, and four pieces of 10-bit data is input into the switching part 284.

In the same manner as the second example, the switching part 284 includes a multiplexer, which is not shown in the figure. The switching part 284 converts m pieces of data into serial-format data (in the following, also referred to as a parallel-serial conversion) for the first to the ninth bit using high-speed clock signal CLK4 having a frequency m times the frequency of the low-speed clock CLK2.

In this example, as shown in FIG. 11, the switching part 284 of the output circuit 28 converts each bistable circuit of the four pieces of data into serial-format data in synchronism with either a rising edge or a falling edge of the high-speed clock signal CLK4 (a rising edge in the figure). The switching part 284 leads the D1 after the parallel-serial conversion, for each the first to the ninth bit to individual data-output buffers 286-0 to 286-9. Also, the switching part 284 leads the high-speed clock signal CLK4 used at the parallel-serial conversion to the clock output buffer 288.

The output buffers 286-0 to 286-9 outputs the differential output of the video data D1 and the inverted video data DiN from the corresponding two output terminals 5cP and 5cN based on each bit of input pixel data D1. In the same manner, the output buffer 288, other than the output buffer 286, outputs the high-speed clock signal CLK4 and the inverted high-speed clock signal CLK4N in consideration of a delay, based on the input high-speed clock signal CLK4, from the corresponding two output terminals 5dP and 5dN.

In this regard, the variation of the third example shown in FIG. 10 is different only in the point that the output buffers 286-0 to 286-9 and 288 are single output, and thus a description of the circuit structure and the operation thereof will be omitted.

In this manner, when the output circuit 28 has a structure in order to handle data corresponding to m vertical columns of data, that is to say, a plurality of pixels, the signal processing part 282, which receives data corresponding to a plurality of pixels first, processes a plurality of pixels (four pixels in the example) in parallel using the low-speed clock CLK2. The switching part 284 selects, in sequence, each signal corresponding to one pixel on the data output from the signal processing part 282 using the high-speed clock signal CLK4 having a frequency m times the frequency of the low-speed clock CLK2, and outputs at a high speed. Thus the parallel-serial conversion part, which causes the output data to become high speed, can be disposed in the nearest vicinity of the data output (in the preceding example, the switching part 284 or the output buffers 286-0 to 286-9, and 288). Accordingly, in the third example and the variation thereof, the same effects as in the structure of the first and second examples can be obtained.

Combination of the Second and the Third Output Circuits

FIG. 12 and FIG. 13 are circuit block diagrams illustrating a combination example structure of the example structures of the second and third output circuits. In both structures, two stages of the switching parts 284a and 284b are provided for the portion of converting into serial-format data. However, each role is different in FIG. 12 and in FIG. 13. In this regard, the structure of differential output is employed both in FIG. 12 and FIG. 13 in the same manner as the second and third examples. However, single output may be employed in the same manner as the variations of the second and third examples. In the following, a specific description will be given.

The example of FIG. 12 has a characteristic in that, in the same manner as the third example, first, m-column data is converted into serial-format data for each bit using the high-speed clock signal CLK4 in the switching part 284a, thereafter the second example structure is applied using the high-speed clock signal CLK5 in the switching part 284b, and this n-bit parallel data is further converted to serial-format data. The high-speed clock signal CLK5 used for converting the n-bit parallel data into the serial-format data in the switching part 284b has a frequency n times the frequency of the high-speed clock signal CLK4, that is to say, m×n times the frequency of the low-speed clock CLK2, and is 4×10=40 in this example.

In contrast, the example of FIG. 13 has a characteristic in that, in the same manner as the third example, first, the second example is applied, the parallel data of n bits for each m columns in the column processing part 26 is converted into serial-format data using the high-speed clock signal CLK3 in the switching part 284a, then the third example is applied using the high-speed clock signal CLK6 in the switching part 284b, and m-column data is further converted into serial-format data. The high-speed clock signal CLK6 used for converting the m-column data into the serial-format data in the switching part 284b has a frequency m times the frequency of the high-speed clock signal CLK3, that is to say, n×m times the frequency of the low-speed clock CLK2, and is 4×10=40 times in this example.

With this arrangement, when the output circuit 28 has a structure to handle m vertical columns of data together, by converting the original parallel data into serial-format data for all m pieces, it is possible to reduce more data-output terminals than the third example and the variation thereof. Also, the parallel-serial conversion part, which causes the output data to become a high speed, can be disposed in the nearest vicinity of the data output (in the preceding example, switching part 284 and output buffers 286-0 to 286-9, and 288). By doing this, the same effects as in the structure of the first to third examples can be obtained.

Fourth Example of Output Circuit

Figure 14A:
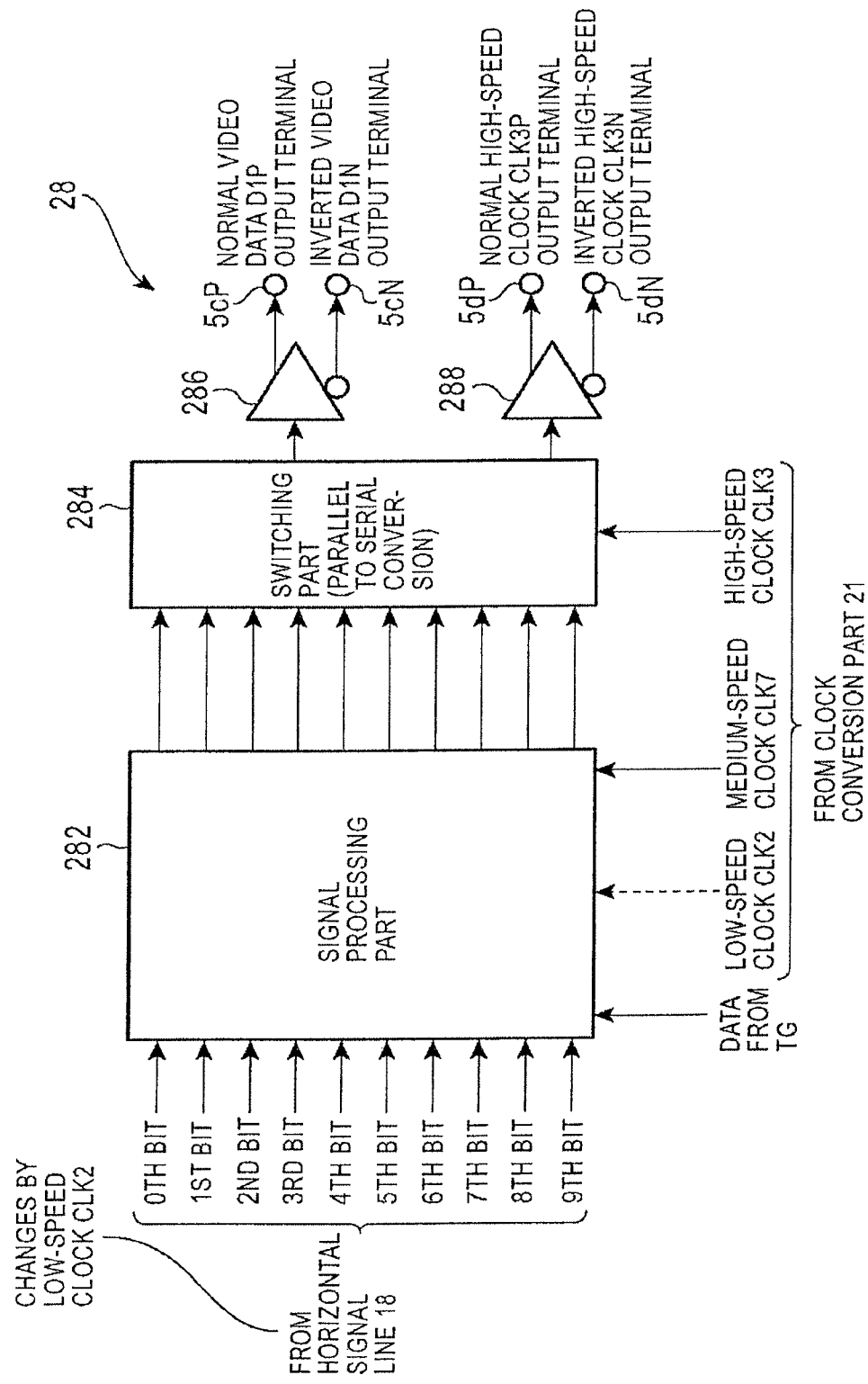

FIGS. 14A and 14B are circuit block diagrams illustrating fourth example structures of the output circuit 28. FIG. 14A illustrates an application to a differential output, and FIG. 14B illustrates an application to a single output. The fourth examples are produced by adding some change to the signal processing part 282 of the second example. In this regard, the same change can be added to the signal processing part 282 of the third example.

Here, in the signal processing part 282 of the second example and the third example, the digital signal processing is performed using low-speed clock CLK2. However, the output circuit 28 of the fourth example is different in that the signal processing is performed using a clock signal having a higher frequency which is higher than two times or more the frequency of the low-speed clock CLK2 and lower than one-half the frequency of the high-speed clock signal CLK3 (Not limited to one. In the following, referred to as a medium-speed clock signal CLK7 together). In this regard, in this case, as shown in the figure, the signal processing part 282 may include a functional portion for performing a predetermined processing using not only the medium-speed clock signal CLK7, but also low-speed clock signal CLK2. In this regard, this medium-speed clock signal CLK7 is a signal having a frequency two times the frequency of the low-speed clock signal CLK2, and is one example of the high-speed clock signal of the present invention.

The medium-speed clock signal CLK7 should be generated by the clock-conversion part 21. That is to say, the clock-conversion part 21 is determined to generate a clock signal having a plurality of different frequencies higher than the low-speed clock CLK2 (in this example, CLK3 and CLK5). For the technique which generates a plurality of clocks having higher frequency than the low-speed clock CLK2 in the clock-conversion part 21, schemes of multiplication circuit by various known circuits can be used in the same manner as in the case of generating one high-speed clock signal CLK3. For example, assuming that k1 and k2 are multiples of the low-speed clock CLK2, a k1-multiplication circuit and k2-multiplication circuit should be provided. Here, a description of the specific schemes thereof is omitted.

Here, the signal processing contents using the low-speed clock CLK2 in the signal processing part 282 includes processing for performing simple addition, subtraction, multiplication, and division for each one pixel signal, for example, digital gain control, vertical line correction, etc. In contrast, the signal processing contents using the medium-speed clock CLK7 includes processing which requires multiple calculations with referring to a plurality of pixel signals, for example, color relation processing, compression processing, etc.

When a digital-signal processing circuit operated by the high-speed clock signal CLK3 is provided in the image sensing device, the power consumption of the device increases. On the other hand, if such a digital-signal processing circuit is not provided in the image sensing device, a similar circuit is disposed at the outside of the circuit. In this case, the power consumption of the entire camera makes little difference whether the digital-signal processing circuit is provided in the device or not. It is sometimes rather more efficient to perform the processing in the device in which the connection with the pixel signals is strong. The second example satisfies such a request.

In such a case, note that the digital-signal processing circuit should be provided in the solid-state image sensing device operated by the high-speed clock signal CLK3, but if the generated heat in the digital-signal processing part in the same chip becomes large, and a dark current of the pixels nearby increases, thereby shading occurs. Therefore, here, signal processing part 282 in the solid-state image sensing device fetches the signal of the medium-speed clock CLK7 in the range of processing target, which is not inconvenient for using the medium-speed clock CLK7 having one-half or less the frequency of the high-speed clock signal CLK3 instead of the high-speed clock signal CLK3.

That is to say, in the fourth example, the signal processing part 282 other than the final circuit portion (in this example, output buffers 286 and 288) from which data is output, high-speed clock signal CLK3 (in this example, the medium-speed clock CLK7) having higher frequency than that of the low-speed clock CLK2 is used. In this regard, here, the frequency of the signal is limited to the range of the medium-speed clock CLK7 having a lower frequency than the high-speed clock signal CLK3. However, it is not excluded to use the high-speed clock signal CLK3 having the frequency range shown in each of the structures described above, or a clock signal having a higher frequency than the high-speed clock signal CLK3 in the signal processing part 282.

Fifth Example of Output Circuit

Figure 15:
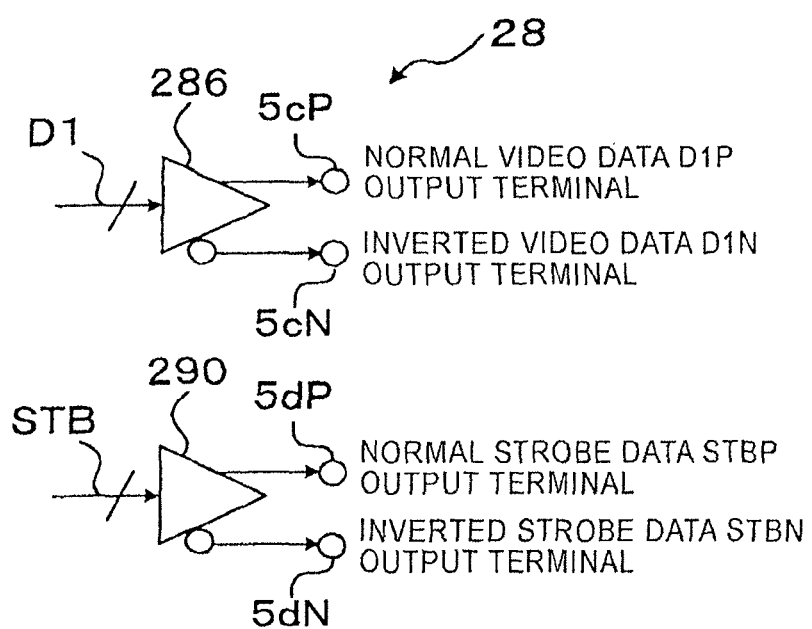
FIG. 15 is a circuit block diagram illustrating a variation of the fifth example structure of the output circuit.
Figure 16:
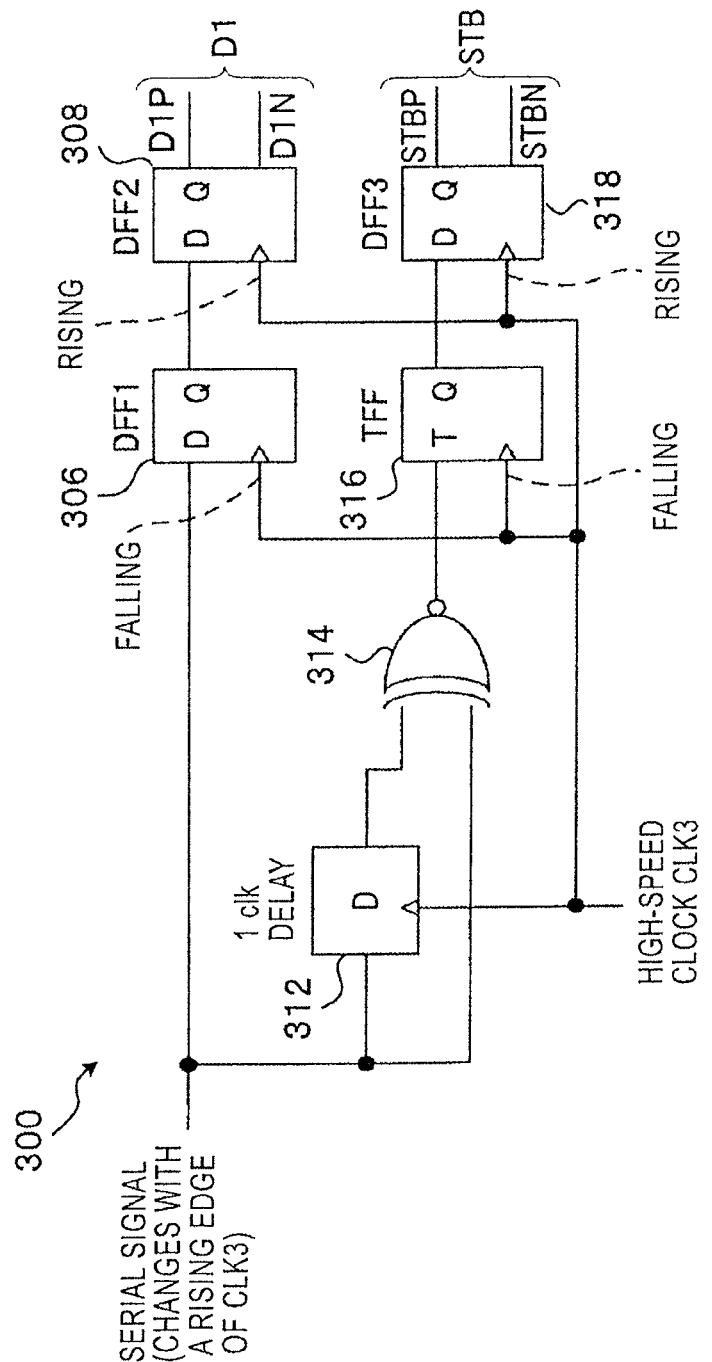
FIG. 16 is a circuit block diagram illustrating an example structure of a strobe-signal generation part used in the fifth example.
Figure 17:
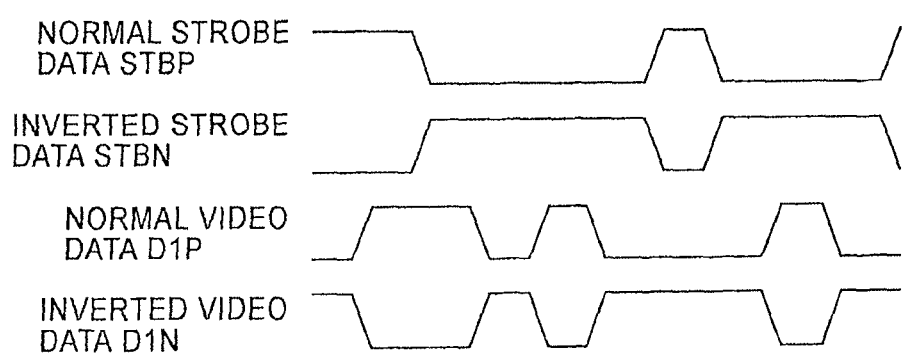
FIG. 17 is a timing chart illustrating a data-output method in the fifth example.

FIG. 15 is a circuit block diagram illustrating a fifth example structure of the output circuit. In this regard, here, only the vicinity of the output buffer of the differential output is shown. Also, FIG. 16 is a circuit block diagram illustrating an example structure of the strobe-signal generation part used in the fifth example. In this regard, here, one of the differential output is shown. Also, FIG. 17 is a timing chart illustrating the data output method in the fifth example. The fifth example has a characteristic in that a strobe data STB capable of reproducing the clock is output by performing an exclusive-OR operation between the clock and the serial-format n-bit output data.

This strobe data strobe data STB is assumed to be used in place of the high-speed clock signal CLK3. That is to say, the strobe data STB is output from the terminal 5d. Here, the strobe data STB is assumed to be a signal inverted at the timing when the video data D1 is not inverted.

The strobe data STB is generated by the signal processing part 282 or the switching part 284 in front of the output buffer 290. This signal is externally output through the output buffer 290 in the same manner as the output buffer 286. For example, as an example of the case of providing a strobe-signal generation part after the signal is serialized, a circuit structure as shown in FIG. 16 should be used.

In the strobe signal generation part 300, parallel-serial converted data is one-clock delayed by the high-speed clock signal CLK3 in a D flip-flop 312, an exclusive-OR operation is performed in an exclusive-OR operation circuit (NXOR) 314, then this signal is input into a T flip-flop 316, and thus the strobe data STB is generated.

At this time, the D flip-flop 312 and the T flip-flop 316 (in synchronism with a falling edge) prevent an error by using the edge of the high-speed clock signal CLK3 as shown in the figure. Therefore, a half-clock delay is adjusted by passing the serial data through the D flip-flop 306 (in synchronism with a falling edge).

Then this serial data and the strobe data STB are adjusted to have the same phase by passing these signals through the D flip-flops 308 (in synchronism with a rising edge) and 318 (in synchronism with a falling edge), which are operating by different edges, respectively.

Each of normal data DIP and STEP output from the normal terminal Q of the D flip-flops 308 and 318, respectively is externally output from the normal terminals 5cP and 5dP through the output buffers 286 and 290, respectively. Also, each of normal data DIN and STBN output from the inverted terminal QN of the D flip-flops 308 and 318, respectively is externally output from the inverted terminals 5cN and 5dN through the output buffers 286 and 290, respectively.

As is understood from FIG. 5, when the high-speed clock signal CLK3 is normally output, a timing, at which both the high-speed clock signal CLK3 and the video data D1 are simultaneously inverted, may occur. When both of them are inverted, the load imposed on the device output becomes the load for both, and the timing depends on the video data D1, thus the timing is not constant.

In contrast, as is understood from FIG. 17, when the strobe data STB is used, either the video data D1P or strobe data STBP is inverted, and either the video data DIN or strobe data STBN is inverted, respectively. The load imposed on the device output at each clock timing is for a half, and is constant. Also, by performing an exclusive-OR operation between the strobe data STB and the video data D1, the high-speed clock signal CLK3 can be reproduced by a circuit block disposed at the back stage of the output circuit 28 or the next stage IC.

In this regard, here, an application to the differential output is shown. However, it is possible to cope with single output in the same manner as the first example by varying the structure in which either normal signal or inverted signal is used for each of the video data D1 and the strobe data STB.

Sixth Example of Output Circuit

Figure 18:
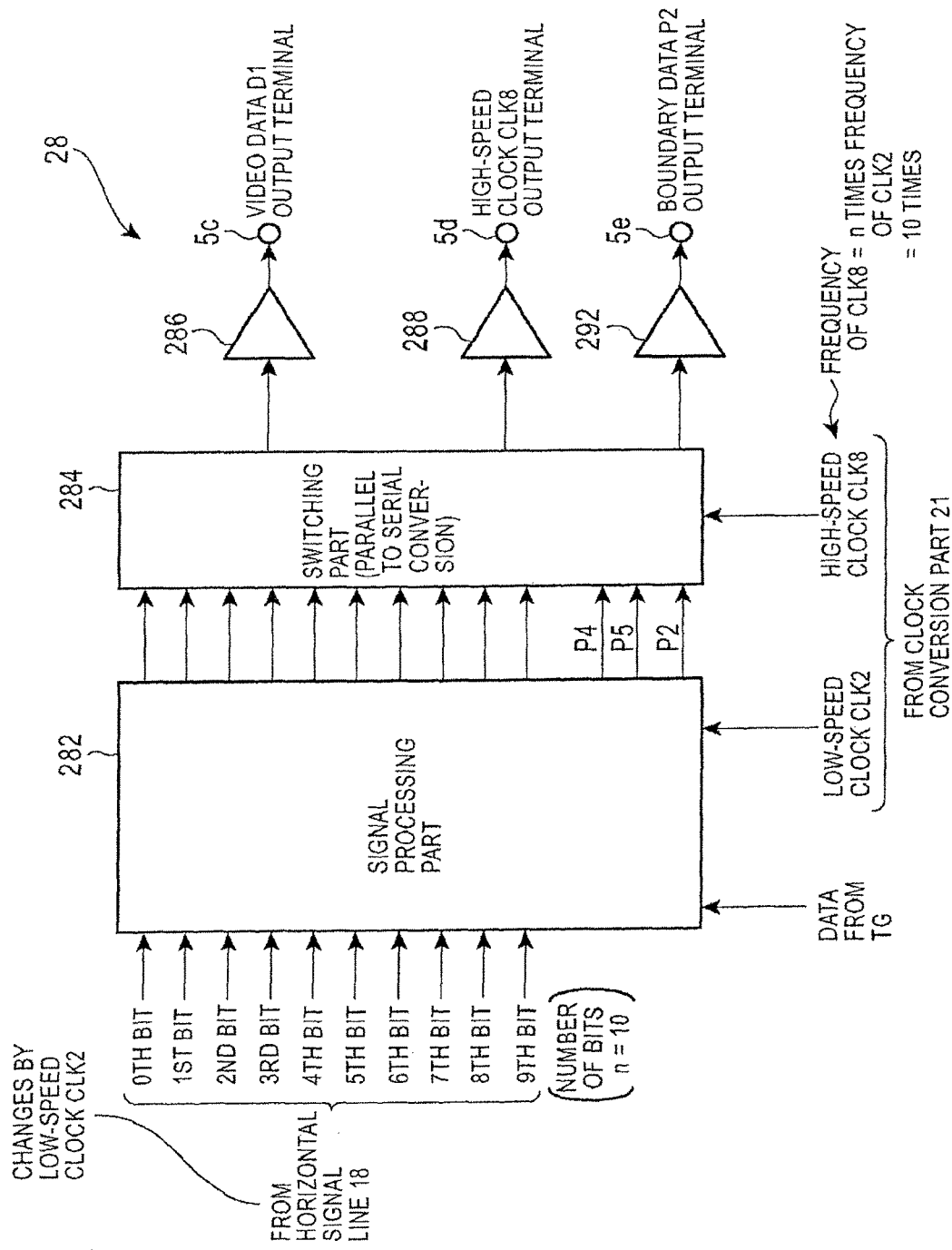
FIG. 18 is a circuit block diagram illustrating a sixth example structure of the output circuit.
Figure 19:
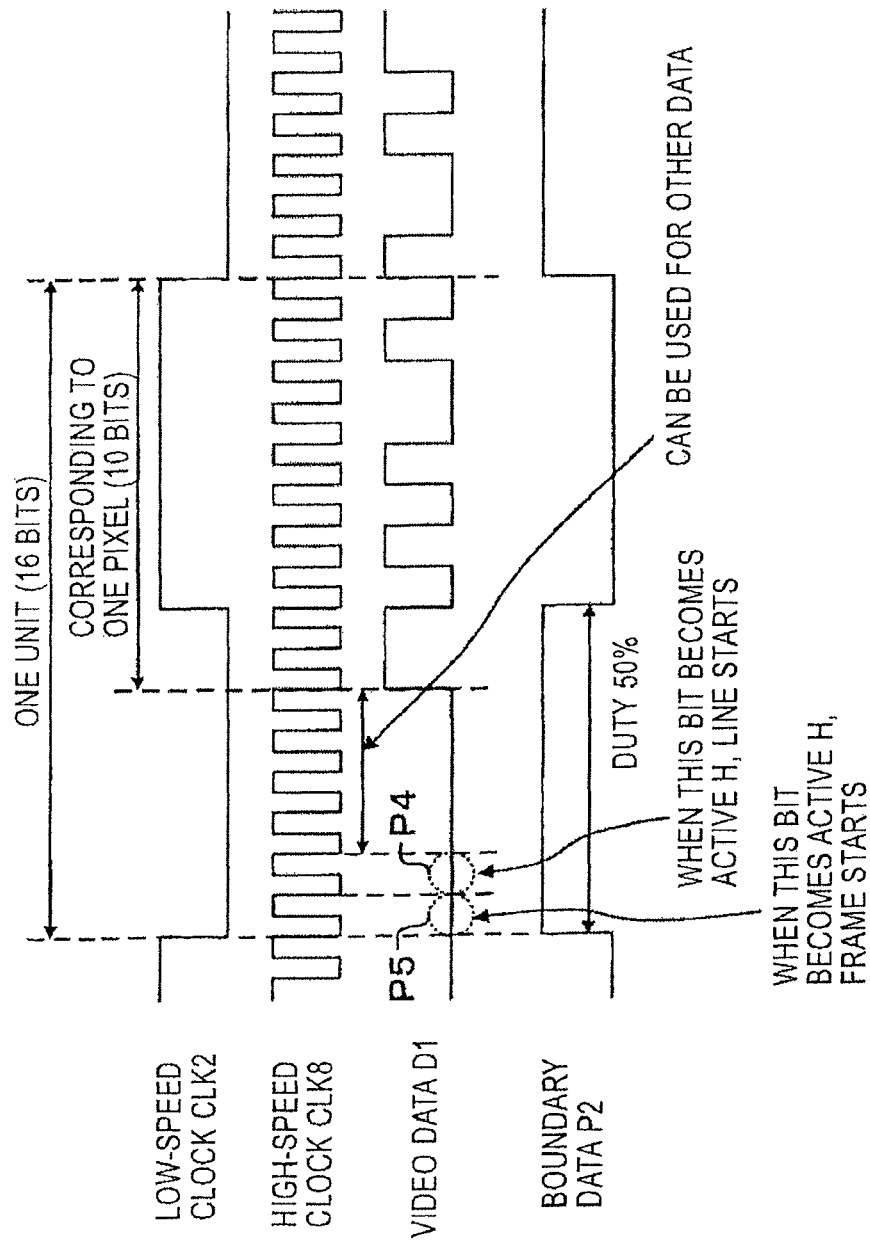
FIG. 19 is a timing chart illustrating a data-output method in the sixth example.

FIG. 18 is a circuit block diagram illustrating a sixth example structure of the output circuit. In this regard, here, only the vicinity of the output buffer of the single output is shown. Also, FIG. 19 is a timing chart illustrating the data output method in the sixth example. The sixth example has a characteristic in that the frequency of the high-speed clock signal is sufficiently obtained for the output of the pixel data, and the other information is output by the surplus.

For example, as shown in FIGS. 3A, 3B, and 3C, in the preceding examples, the high-speed clock signal CLK3 having a frequency the number-of-bit times the frequency of the low-speed clock CLK2 is used in order to convert the parallel data into serial-format data in the same time period as one cycle of the low-speed clock CLK2, by which the signal processing part 282 fetches the pixel data represented by 10 bits/parallel.

In contrast, as shown in FIG. 19, in the sixth example, by making the frequency higher than the number-of-bit times, first, more number of bits to represent the data for one pixel in a serial-format data (in this example, 10 bits) is obtained as data assignment portion. In this example, by using the high-speed clock signal CLK8 having a frequency 16 times the frequency of the low-speed clock CLK2, 16 bits on the whole is obtained for each one unit. The desired data other than the pixel data is assigned for the surplus portion (in the following, referred to as an additional data portion, and 6 bits in this example), which the number of bits of one pixel is subtracted from the one unit of the data assigned portion. That is to say, additional data is virtually embedded for each pixel data.

For example, by increasing the frequency of the high-speed clock signal higher than the high-speed clock signal CLK3, information other than the information derived from the pixel is output. There has been a little possibility of an occurrence of an error at a data rate such as tens of MHz up to now. However, with an increase in speed, it becomes complicated. Thus it is preferable to have identification information in order to prevent an error.

The boundary data P2 output by the output buffer 292 is assigned for each one unit (in this example, 16 bits) of the video data D1. As shown in FIG. 19, the duty thereof may be set to 50%, and may be virtually the data having the opposite polarity to the low-speed clock CLK2.

Alternatively, the duty thereof may be changed to a value other than 50% as shown in FIG. 3C.

The desired data to be assigned to the additional data portion obtained for 6 bits includes data P4 indicating a start and an end of a line (That is to say, the data indicating a change of lines), or data P5 indicating a start and an end of a frame (That is to say, the data indicating a change of frames). For example, as shown in FIG. 18, the switching part 284 obtains not only the bit data of the video data D1 from the signal processing part 282, but also the data P4 and P5. Then the switching part 284 converts one-pixel bit data and the data P4 and P5 together into the serial-format data using the high-speed clock signal CLK8, and thus the data P4 and P5 is embedded into the pixel data as additional data.

Up to now, a start of a line and a start of a frame are input from the outside of the solid-state image sensing apparatus, and the signals of the solid-state image sensing apparatus are output in synchronism with them. However, in the structure of this embodiment, obtaining this synchronization is difficult, because the frequency of the output data is high. Thus it is preferable to newly output data indicating a start of a line and a start of frame from the solid-state image sensing apparatus. At this time, if another terminal is provided, the number of terminals increases. However, as described above, the output can be at the same terminal, and thus the number of terminals will not be increased.

Also, for another example, when the solid-state image sensing apparatus 1 is for color-image sensing as in the present embodiment, for example, color-filter arrangement is different depending on an even-numbered column and an odd-numbered column. Thus, in order to prevent an error in the recognition, the assignment of identification information of indicating to which the color separation filter (color component) the pixel signal corresponds is considered. Also, when thinning-out reading is performed, it may be used to assign the information indicating how many pixels the thinning-out operation skips, or whether with or without additions. These signals have roles of checking an error which increases with high-speed output. Thus the obstacles of higher-speed output can be eliminated without increasing the terminals.

At any rate, with an increase in frequency, the possibility that an error occurs in changing lines, changing frames, or arranging color filters becomes stronger. In addition, once an error occurs, the error is carried on to the subsequent data, and thus a normal image cannot be reproduced. Therefore, the effect is enormous, and thus it is highly effective to embed data indicating a change of a line or a frame, or a color filter in each pixel data.

In this regard, here, the boundary data P2 is also output. However, the boundary data P2 may not be used. Also, here, each data is in synchronism with a falling edge of the high-speed clock signal CLK8. However, it may be in synchronism with a rising edge. Also, an example is shown in the case of applying to a single output method. However, for each of the video data D1 and the strobe data STB, it can cope with differential output by varying the structure of using both the normal and the inverted signals as in the variation of the first example and the other structure examples.

Figure 20:
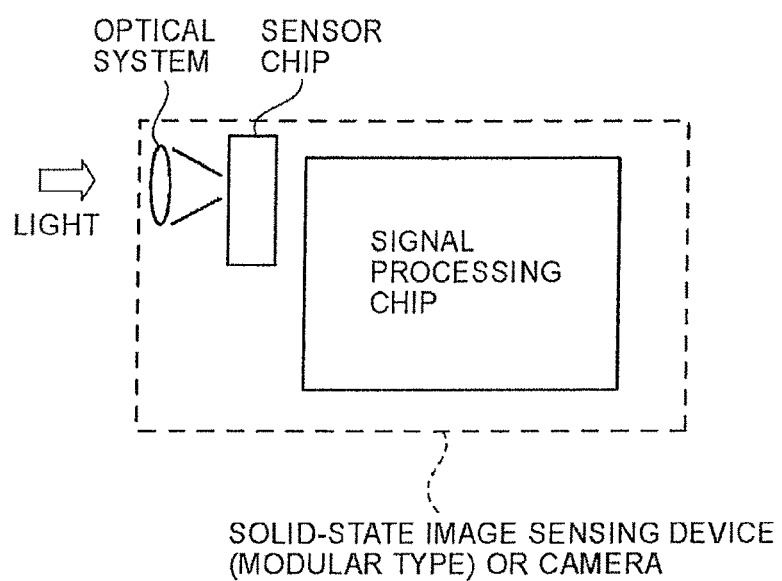
FIG. 20 is a schematic diagram illustrating the structure of a solid-state image sensing device (modular type) or a camera according to an embodiment of the present invention.

In this regard, a solid-state image sensing apparatus according to the present invention may be a solid-state image sensing apparatus formed as one chip, or may be a modular type solid-state image sensing apparatus formed as a collection of a plurality of chips. When the solid-state image sensing apparatus is formed as a collection of a plurality of chips, for example, as shown in FIG. 20, the apparatus may be formed separately by a sensor chip for picking up images, a signal processing chip for performing digital signal processing, etc., and further include an optical system.

Also, when the present invention is applied to a camera, it becomes possible to keep the power consumption of the entire camera low, and to obtain excellent image quality.

While the present invention has been described above using the embodiments, the technical range of the present invention is not limited to the scope set forth in the specific embodiments described above. Various changes and modifications may be made to the embodiments described above without departing from the spirit and scope of the invention, and all such changes and modifications should be considered to be within the technical scope of the present invention.

Also, the above-described embodiments are not limiting the invention set forth in the appended claims. Also, all of the combinations of the characteristics described in the embodiments are not necessarily required for the solving means of the invention. The above-described embodiments include various stages of invention, and various inventions can be extracted from appropriate combinations of a plurality of the components disclosed. If some components are deleted from all the components shown in an embodiment, as far as an effect is obtained, the structure without these components can be extracted as an invention.

For example, in the above-described embodiments, when using the high-speed clock signal, in order to reduce noises and unnecessary radiation, the structure, in which the clock-conversion part 21 is disposed in the nearest vicinity (in the preceding example, output circuit 28) of the portion (that is to say, a circuit portion using the high-speed clock signal) of the image sensing device from which high-speed data is output, is shown. However, for example, by paying attention only to power consumption, the clock-conversion part 21 can be disposed at another place when noises and unnecessary radiation are not considered. For example, it is possible to dispose the clock-conversion part 21 in the vicinity of the communication/timing generation part 20, or the clock-conversion part 21 may be designed to be integrated with the communication/timing generation part 20.

Also, as an example of using the high-speed clock signal only in the output circuit, examples of converting the entire one pixel or one pixel and additional data together to serial-format data are shown. However, the structure is not limited to this. When the output data based on the pixel data is externally output, it is allowed to output the data from the terminals which are fewer than the number of bits of the AD-converted digital data. For example, a part of one pixel data may be converted to serial-format data, for example, converting two bits of the s-th bit and the (2s−1)-th bit. In this case, an advantage in that the output circuit is operated at a high speed with a fewer terminals than the case of simply outputting all the bits in parallel-format data can be obtained.

As an example of using the high-speed clock signal only at the output circuit, an example of serializing data is described. However, the use of the high-speed clock signal is not limited to data serialization. For example, the high-speed clock signal can be used for movement extraction which requires multiple high-speed calculations and compression, processing.

Also, when switching the frequencies of the high-speed clock signal by an external frequency switching command P3, if the clock-conversion part 21 generates a plurality of high-speed clock signals, a structure, in which a switching instruction can be notified for each frequency, may be used.

Also, as an example of the solid-state image sensing apparatus capable of arbitrary selecting and reading a signal from individual unit pixel by address control, a CMOS sensor including an pixel area, which generates signal electric charge by receiving light, is described as an example. However, the generation of signal electric charge is not limited to light, and can be applicable to electromagnetic waves in general, for example, infrared light, ultraviolet light, or X-rays. The above-described embodiments can be applicable to an image sensing apparatus including a pixel area having an array of a large number of pixels which receives the electromagnetic waves, and outputs analog signals in accordance with the amount thereof.

What is claimed is:

1. An imaging device comprising:
   a pixel area including a plurality of pixels arranged in a two-dimensional matrix;
   an n-bit AD-conversion part configured to convert an analog signal outputted from m columns of the two-dimensional matrix into a digital signal; and
   an output circuit comprising:
      a signal processing part configured to process the digital signal based on a low-speed clock signal;
      a parallel-to-serial conversion part configured to convert the processed digital signal into a serial format based on a normal high-speed clock signal;
      a first output terminal for externally outputting a normal video data which is corresponding to the digital signal;
      a second output terminal for externally outputting an inverted video data;
      a third output terminal for externally outputting the normal high-speed clock signal; and
      a fourth output terminal for externally outputting an inverted high-speed clock signal,
   wherein the output circuit is configured to output the normal video data, the inverted video data, the normal high-speed clock signal, and the inverted high-speed clock signal,
   wherein the normal high-speed clock signal has a frequency which is higher than a frequency of an input clock signal from outside of the imaging device, and is m times, n times, or m×n times a frequency of the low-speed clock signal, and
   wherein m and n are positive integers.

2. The imaging device according to claim 1, further comprising a PLL circuit.

3. The imaging device according to claim 2, wherein the normal high-speed clock signal is generated by the PLL circuit.

4. The imaging device according to claim 2, wherein AD-conversion part, the PLL circuit, and the output circuit are disposed on a common substrate.

5. The imaging device according to claim 1, wherein the pixel area, the AD-conversion part, and the output circuit are disposed on a common chip.

6. The imaging device according to claim 1, wherein the pixel area, the AD-conversion part, and the output circuit are disposed on a common semiconductor substrate.

7. The imaging device according to claim 1, wherein the AD-conversion part includes a plurality of AD-convertors, each of the plurality of AD-convertors is associated to pixels arranged on the same column of the pixel area.

8. The imaging device according to claim 1, wherein the output circuit is used as LVDS (Low Voltage Differential Signaling) interface.

9. A camera including the imaging device according to claim 1.

10. An imaging device comprising:
    a pixel area including a plurality of pixels arranged in a two-dimensional matrix;
    an n-bit AD-conversion part configured to convert an analog signal outputted from m columns of the two-dimensional matrix into a digital signal; and
    an output circuit comprising:
       a signal processing part configured to process the digital signal based on a low-speed clock signal;
       a parallel-to-serial conversion part configured to convert the processed digital signal into a serial format based on a normal high-speed clock signal;
       a first output terminal for externally outputting a normal video data which is corresponding to the digital signal;
       a second output terminal for externally outputting an inverted video data;
       a third output terminal for externally outputting the normal high-speed clock signal; and
       a fourth output terminal for externally outputting an inverted high-speed clock signal,
    wherein the output circuit is configured to output the normal video data, the inverted video data, the normal high-speed clock signal, and the inverted high-speed clock signal,
    wherein the normal high-speed clock signal has a frequency which is higher than a frequency of a master clock of the imaging device, and is m times, n times, or m×n times a frequency of the low-speed clock signal, and
    wherein m and n are positive integers.

11. The imaging device according to claim 10, further comprising a PLL circuit.

12. The imaging device according to claim 11, wherein the normal high-speed clock signal is generated by the PLL circuit.

13. The imaging device according to claim 11, wherein AD-conversion part, the PLL circuit, and the output circuit are disposed on a common substrate.

14. The imaging device according to claim 10, wherein the pixel area, the AD-conversion part, and the output circuit are disposed on a common chip.

15. The imaging device according to claim 10, wherein the pixel area, the AD-conversion part, and the output circuit are disposed on a common semiconductor substrate.

16. The imaging device according to claim 10, wherein the AD-conversion part includes a plurality of AD-convertors, each of the plurality of AD-convertors is associated to pixels arranged on the same column of the pixel area.

17. The imaging device according to claim 10, wherein the output circuit is used as LVDS (Low Voltage Differential Signaling) interface.

18. A camera including the imaging device according to claim 10.

19. An imaging device comprising:
    a pixel area including a plurality of pixels arranged in a two-dimensional matrix;
    an n-bit AD-conversion part configured to convert an analog signal outputted from m columns of the two-dimensional matrix into a digital signal; and an output circuit comprising:
- a signal processing part configured to process the digital signal based on a third clock signal;
- a parallel-to-serial conversion part configured to convert the processed digital signal into a serial format based on a first clock signal;
- a first output buffer for outputting a first data signal and a second data signal obtained by inverting the first data signal; and
- a second output buffer for outputting the first clock signal and a second clock signal obtained by inverting the first clock signal, wherein the first data signal, the second data signal, the first clock signal, and the second clock signal are configured for connection to a next stage that is separated from the imaging device, wherein the first clock signal has a frequency which is higher than a frequency of an input clock signal from outside of the imaging device, and is m times, n times, or m×n times a frequency of the third clock signal for processing the digital signal, and wherein m and n are positive integers.

20. The imaging device according to claim 19, further comprising a PLL circuit, wherein the first clock signal is generated by the PLL circuit.

21. The imaging device according to claim 19, wherein the output circuit is used as LVDS (Low Voltage Differential Signaling) interface.

22. A camera including the imaging device according to claim 19.

23. An imaging device comprising:
- a pixel area including a plurality of pixels arranged in a two-dimensional matrix;
- an n-bit AD-conversion part configured to convert an analog signal outputted from m columns of the two-dimensional matrix into a digital signal; and
- an output circuit configured to process the digital signal based on a third clock signal, to convert the processed digital signal into a serial format based on a first clock signal, to output a first data signal, to output a second data signal obtained by inverting the first data signal, to output the first clock signal, and to output a second clock signal obtained by inverting the first clock signal, wherein the first data signal, the second data signal, the first clock signal, and the second clock signal are configured for connection to a next stage that is separated from the imaging device, wherein the first clock signal has a frequency which is higher than a frequency of an input clock signal from outside of the imaging device, and is m times, n times, or m×n times a frequency of the third clock signal, and wherein m and n are positive integers.

24. The imaging device according to claim 23, further comprising a PLL circuit, wherein the first clock signal is generated by the PLL circuit.

25. The imaging device according to claim 23, wherein the output circuit is used as LVDS (Low Voltage Differential Signaling) interface.

26. A camera including the imaging device according to claim 23.

* * * * *